(12) United States Patent
Sampath

(10) Patent No.: US 11,499,102 B2
(45) Date of Patent: Nov. 15, 2022

(54) CATALYST AND PROCESSES FOR AROMATIZATION

(71) Applicant: CHEVRON U.S.A. INC, San Ramon, CA (US)

(72) Inventor: Vijay R. Sampath, San Ramon, CA (US)

(73) Assignee: CHEVRON U.S.A. INC, San Ramon, CA (US)

( * ) Notice: Subject to any disclaimer, the term of this patent is extended or adjusted under 35 U.S.C. 154(b) by 176 days.

(21) Appl. No.: 17/076,471

(22) Filed: Oct. 21, 2020

(65) Prior Publication Data

US 2021/0115341 A1 Apr. 22, 2021

Related U.S. Application Data

(63) Continuation-in-part of application No. PCT/IB2019/057058, filed on Aug. 21, 2019.

(60) Provisional application No. 62/720,802, filed on Aug. 21, 2018.

(51) Int. Cl.
| | |
|---|---|
| *C10G 35/085* | (2006.01) |
| *B01J 8/00* | (2006.01) |
| *B01J 8/06* | (2006.01) |
| *B01J 23/42* | (2006.01) |

(Continued)

(52) U.S. Cl.
CPC .......... *C10G 35/085* (2013.01); *B01J 8/0015* (2013.01); *B01J 8/062* (2013.01); *B01J 23/42* (2013.01); *B01J 29/60* (2013.01); *B01J 35/02* (2013.01); *B01J 2229/26* (2013.01); *C10G 2300/1096* (2013.01); *C10G 2300/4018* (2013.01); *C10G 2300/70* (2013.01); *C10G 2400/30* (2013.01)

(58) Field of Classification Search
CPC ................ C10G 35/085; C10G 35/095; C10G 2300/1044; C10G 2300/1096; C10G 2300/4018; C10G 2300/70; C10G 2400/30; B01J 8/0015; B01J 8/062; B01J 23/42; B01J 29/60; B01J 35/02; B01J 2229/26

See application file for complete search history.

(56) References Cited

U.S. PATENT DOCUMENTS

| | | |
|---|---|---|
| 3,216,789 A | 11/1965 | Breck et al. |
| 4,104,320 A | 8/1978 | Bernard et al. |
| 4,424,311 A | 1/1984 | Nagaoka et al. |

(Continued)

FOREIGN PATENT DOCUMENTS

| | | |
|---|---|---|
| EP | 0201856 A1 | 11/1986 |
| EP | 0403976 A2 | 12/1990 |

(Continued)

*Primary Examiner* — Brian A McCaig
(74) *Attorney, Agent, or Firm* — Hunton Andrews Kurth LLP

(57) ABSTRACT

The present invention pertains to improved processes and catalysts for aromatization. The processes generally contacting a feed stream comprising a naphtha fraction having a $C_6$ to $C_8$ content with a catalyst pellet composition to form aromatic hydrocarbons. The catalyst pellet composition generally comprises a plurality of cylindrical pellets each pellet comprising a Group VIII metal on a zeolite. The pellets may have (a) a plurality of holes passing through the length of the cylindrical pellets, (b) a dome-shaped top and bottom, and (c) a plurality of semi-circular grooves along the length of the exterior of the cylinder.

20 Claims, 6 Drawing Sheets

(51) Int. Cl.
    *B01J 29/60*     (2006.01)
    *B01J 35/02*     (2006.01)

(56) References Cited

U.S. PATENT DOCUMENTS

| | | |
|---|---|---|
| 4,435,283 A | 3/1984 | Buss et al. |
| 4,447,316 A | 5/1984 | Buss |
| 4,456,527 A | 6/1984 | Buss et al. |
| 4,517,306 A | 5/1985 | Buss |
| 4,681,865 A | 7/1987 | Katsuno et al. |
| 5,091,351 A | 2/1992 | Murakawa et al. |
| 5,879,538 A | 3/1999 | Haritatos |
| 6,004,452 A | 12/1999 | Ash et al. |
| 6,036,264 A | 3/2000 | Lucree |
| 6,812,180 B2 | 11/2004 | Fukunaga |
| 9,914,678 B2 | 3/2018 | Iaccino et al. |
| 2001/0041159 A1* | 11/2001 | Tamhankar ............... C01B 3/386 423/418.2 |
| 2003/0040426 A1* | 2/2003 | Barrera ............... B01J 37/0201 502/79 |
| 2018/0170837 A1 | 6/2018 | Wu |
| 2019/0201861 A1 | 7/2019 | McGahee et al. |
| 2019/0203128 A1 | 7/2019 | McGahee et al. |
| 2019/0249091 A1 | 8/2019 | Snell et al. |
| 2021/0115342 A1* | 4/2021 | Harandi ............... C10G 35/095 |

FOREIGN PATENT DOCUMENTS

| | | | |
|---|---|---|---|
| EP | 0498482 A1 | 8/1992 | |
| WO | WO 2010/029323 A1 * | 3/2010 | ............... B01J 35/02 |
| WO | WO 2014/116269 A1 * | 7/2014 | ............... C10G 11/14 |

\* cited by examiner

Figures 5A-D and 6A-B (below)
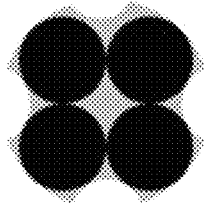
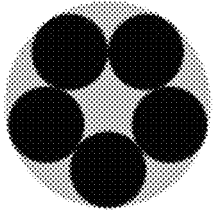
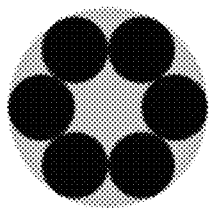
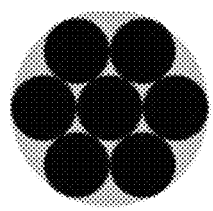
Fig 5A. Quadralobe cylindrical pellet
Fig 5B. Five-hole cylindrical pellet
Fig 5C. six-hole cylindrical pellet
Fig 5D. seven-hole cylindrical pellet
The preferred shape with seven equal-sized holes, six flutes on the periphery with domed top and bottom
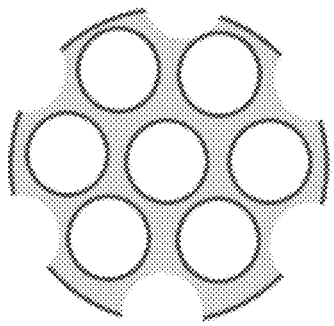
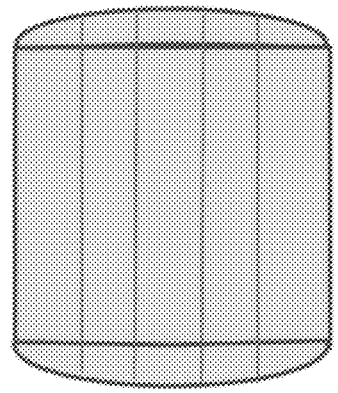
Fig 6A. 7H6GD cylindrical pellet Plan View
Fig 6B. 7H6GD cylindrical pellet Elevation View

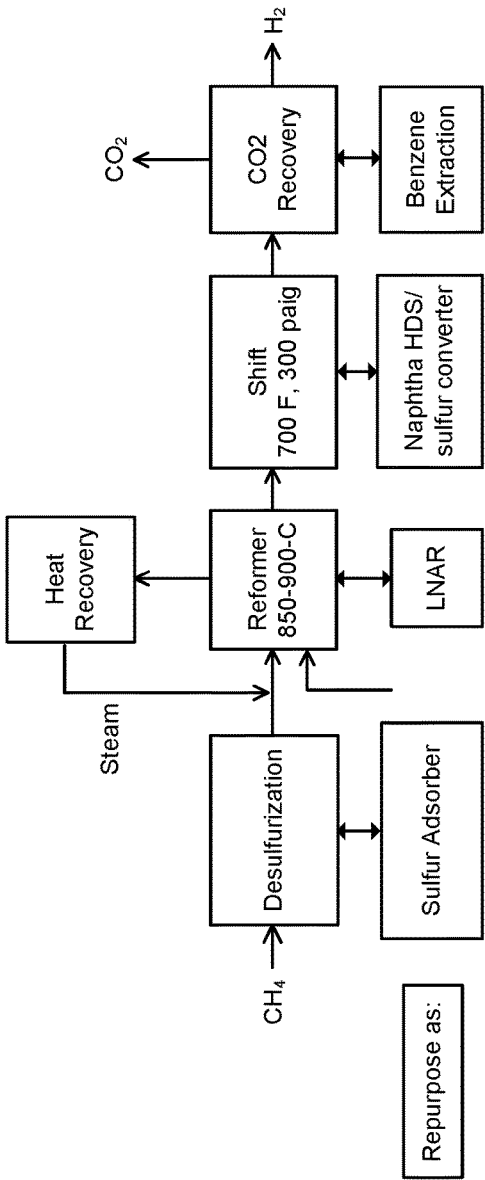
Fig. 7A. Simplified SMR Block Flow Diagram
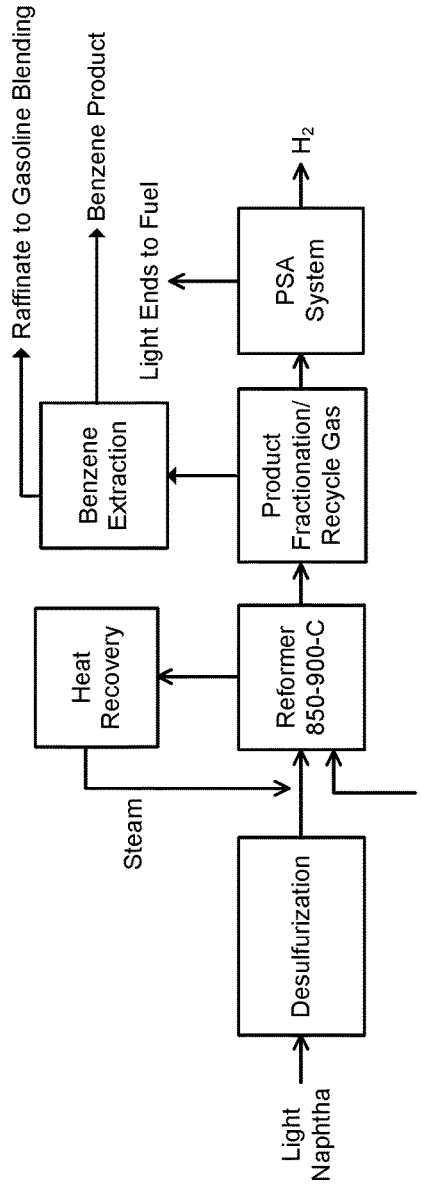
Fig. 7B. Simplified Light Naphtha Aromatization Reformer (LNAR) Block Flow Diagram

| Pellet Characteristics | Katalco 25-4MQ | Katalco 25-4Q | Katalco 25-4GQ | Katalco 25-4LQ | 7H6GD Invention | 7H6GD Invention | 7H6GD Invention | 7H6GD Invention |
|---|---|---|---|---|---|---|---|---|
| Pellet Shape |  |  |  |  |  |  |  |  |
Figure 8

CATALYST AND PROCESSES FOR AROMATIZATION

CROSS-REFERENCE TO RELATED APPLICATIONS

The present application is a continuation in part of pending WO 2020/039374 filed Aug. 21, 2019 which claims priority to U.S. provisional application No. 62/720,802 filed Aug. 21, 2018, both of which applications are incorporated herein by reference for U.S. purposes.

FIELD OF INVENTION

The present invention is directed to an improved catalyst and process for aromatization of, for example, naphtha.

BACKGROUND AND SUMMARY OF THE INVENTION

Non-acidic monofunctional catalysts for Light Naphtha Aromatization such as "Platinum on L-Zeolite (Pt/KL)" and "Platinum on Halogen-treated L-Zeolite (Pt/FKL)" are well known in the art. Also known, are processes for producing light aromatics by disposing the above "Platinum on Halogen-treated L-Zeolite" catalyst inside the tubes of a multi-tubular externally heated reactor with axial flow of light naphtha plus hydrogen feedstock inside the tubes. In one case, the externally heated tubular reactor contained as many as 12000×15-foot long, 1-inch diameter tubes. The very large number of tubes made this scheme unviable.

U.S. Pat. No. 5,879,538 teaches Platinum on L-Zeolite catalyst in the form of 1/16 in. extrudate loaded inside 800-odd×15-foot long, 3-inch diameter fired-heater tubes of a conventional Furnace for Light Naphtha Aromatization. However, excessive tube side pressure-drop due to use of conventional 1/16-inch extrudate catalyst and/or very large number of short tubes also made this scheme unviable.

U.S. Pat. No. 6,812,180 B2 pertained to an improved Platinum on Halogen-treated L-Zeolite (Pt/FKL) catalyst with higher aromatization and lower hydrogenolysis activity, favoring aromatization over cracking, and offering enhanced stability. More recently, U.S. Patent Application 2019/0201861 teaches a reactor configuration incorporating one or more isothermal multi-tubular furnace reactors, in sequence with preceding radial-flow adiabatic reactors, for light naphtha aromatization. Unfortunately, this still requires the use of conventional 1/16 in. or 1/8 in. extrudate catalyst and as many as 5000 small diameter furnace tubes. To date, the prior art has focused on loading 1/16 in. or 1/8 in. extrudate catalyst pellets in small diameter (1 in to 4 in) furnace tubes of short (4.5 m) length. This results in a large number of furnace tubes. Distributing both, hydrogen and naphtha feedstock, evenly across such a large number of tubes is a substantial challenge. The furnace and distribution manifold become unwieldy and the scheme is not commercially viable.

WO 2020/039374 discloses a catalytic reforming process and system for producing aromatic hydrocarbons that dispenses with the need for a series of fired heaters followed by adiabatic reactors, by loading the catalyst directly inside the tubes of a fired heater. Unlike the prior art described above this method utilizes large diameter and long furnace tubes. The Pt on KL zeolite catalyst is disposed on a monolith substrate such as Cordierite or FeCrAl or Copper to overcome the high axial pressure drop while keeping the tube count manageable. However, it would still be desirable to develop processes and catalysts with improved radial thermal conductivity and better radial mixing. It would also be desirable to further reduce the number of tubes required for a given service, reduce the radial temperature gradient needed to drive heat transfer, and reduce tube wall temperature. It would further be desirable if improved processes and catalysts improved tube life, reduced coke build-up on the walls, improved catalyst efficiency, and improved catalyst life, i.e., reduced deactivation.

Advantageously, the processes and catalysts described herein accomplish many of the aforementioned needs and more. In one embodiment, the application pertains to a process for forming aromatic hydrocarbons from a hydrocarbonaceous feed stream. The process comprises contacting a feed stream comprising a naphtha fraction having a $C_6$ to $C_8$ content with a packed bed of catalyst pellets effective to form aromatic hydrocarbons by catalytic reforming of the feed stream hydrocarbons in the presence of heat. The catalyst bed generally comprises a plurality of cylindrical pellets, each pellet comprising a Group VIII metal on L-zeolite, wherein the plurality of cylindrical pellets is characterized by: (a) a plurality of holes passing through the length of the cylindrical pellets, (b) a dome-shaped top and bottom, and (c) a plurality of semi-circular grooves cut along the length of the exterior of the cylinder.

In another embodiment the application pertains to a catalyst bed composition comprising a plurality of cylindrical pellets, each pellet comprising a Group VIII metal on L-zeolite wherein the plurality of cylindrical pellets is characterized by: (a) a plurality of holes passing through the length of the cylindrical pellets, (b) a dome-shaped top and bottom, and (c) a plurality of semi-circular grooves cut along the length of the exterior of the cylinder.

In another embodiment the application pertains to a catalyst bed composition comprising: a plurality of cylindrical platinum over FKL and/or KL zeolite catalyst pellets. One or more of the plurality of cylindrical platinum FKL or KL catalyst pellets is characterized by: (a) seven cylindrical holes passing through the length of the cylindrical pellets wherein one of the seven cylindrical holes is located in the center, (b) a dome-shaped top and bottom wherein each of the dome height of the dome-shaped top and the dome-shaped bottom is 12.5 percent or less of the cylinder height of the catalyst pellet, irrespective of the dome-shaped top and bottom on the pellet, and (c) a plurality of semi-circular grooves cut along the length of the exterior of the cylinder, wherein the diameter of the plurality of semi-circular grooves is within 10% of the diameter of each of the seven cylindrical holes.

Advantageously, some embodiments may lead to improved reforming processes and systems that lead to lower capital and operating costs for producing aromatic hydrocarbons. The processes may include contacting the feedstream with a catalyst contained within the heater tubes of a reactor furnace, the catalyst being disposed as multi-holed, multi-grooved pellets, and providing heat to the furnace heater tubes. The catalyst may comprise a non-acidic monofunctional catalyst, effective to form aromatic hydrocarbons by catalytic reforming of the feedstream hydrocarbons, e.g., an L-zeolite catalyst, and the feedstream may comprise a naphtha fraction, typically a naphtha feedstream having a predominately $C_6$ to $C_8$ content.

In other embodiments, the application is directed to a system for the catalytic reforming of a hydrocarbonaceous feedstream to form aromatic hydrocarbons. The system often comprises a feed preparation section to desulfurize the feed, a feed preheat section to preheat the feed, a feed distribution system to distribute the naphtha and recycle hydrogen proportionately and equally across a very large number of parallel furnace reactor tubes, a reforming furnace reactor containing heater tubes with a catalyst contained within the heater tubes of the furnace, and a heat source to provide heat to the furnace heater tubes for the catalytic reforming of the feedstream hydrocarbons to form aromatic hydrocarbons. The catalyst of the system may comprise a non-acidic monofunctional catalyst, effective to form aromatic hydrocarbons by catalytic reforming of the feedstream hydrocarbons, e.g., an L-zeolite catalyst. In other embodiments the application pertains to methods of converting a plant for steam methane reforming into a plant for light naphtha aromatization.

BRIEF DESCRIPTION OF THE DRAWINGS

FIG. 5A is a quadrolobe.

FIG. 5B is a five-hole pellet.

FIG. 5C is a six-hole pellet.

FIG. 5D is a seven-hole pellet.

FIG. 6A is a plan view of seven-holed, six-grooved domed pellet.

FIG. 6B is an elevation view of seven-holed, six-grooved domed pellet.

FIGS. 7A and 7B shows SMR and LNAR block flow diagrams respectively. FIG. 8 shows the pellet shape of the pellets in Table 3 Comparison of Multi-holed, multi-grooved catalyst pellet shapes for LNAR.

DETAILED DESCRIPTION

Figure 1:
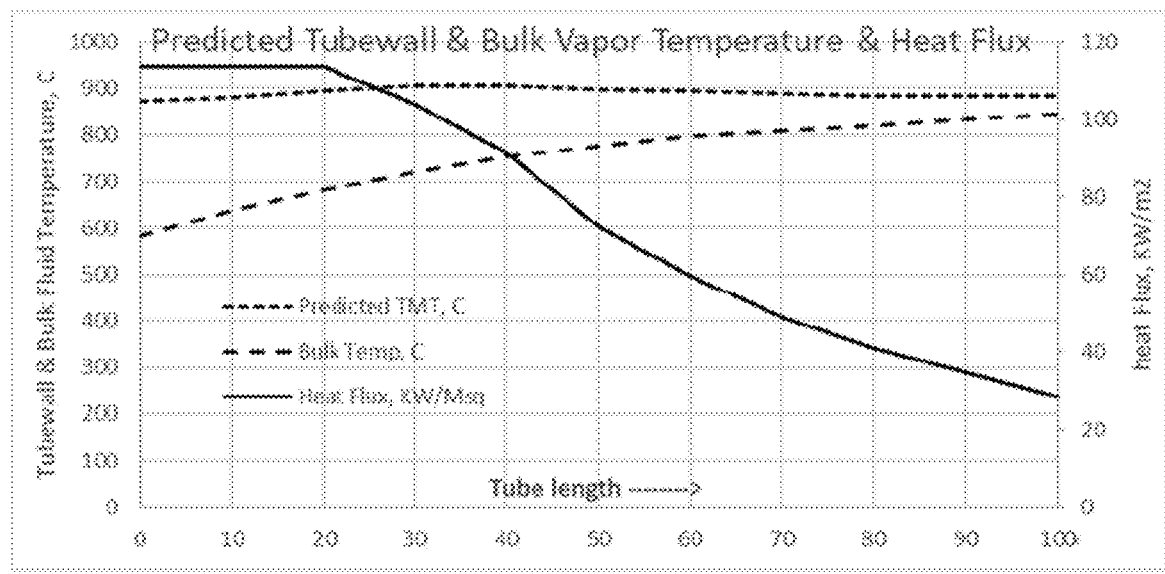
FIG. 1 is a typical heat profile chart for a multi-tubular top-fired SMR Furnace Reactor.
Figure 2:
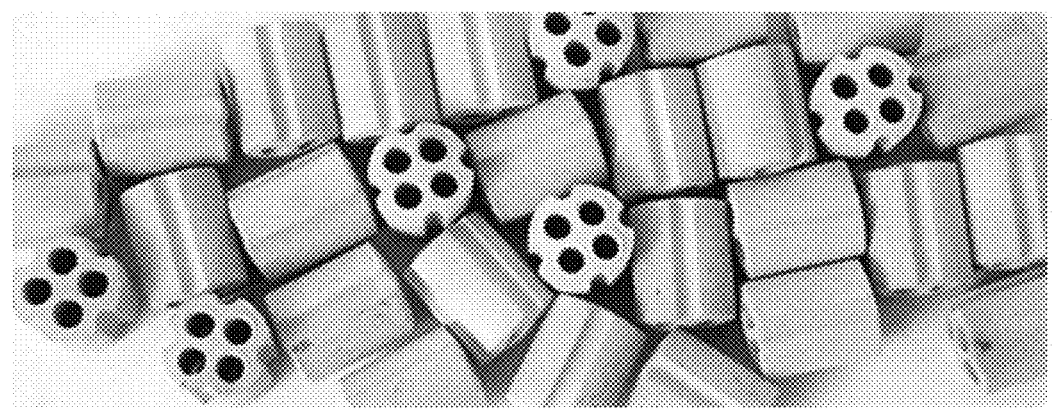
FIG. 2 is a quadrolobe catalyst.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Definitions

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"Aromatization", "aromatizing", and "reforming" as used herein refer to the catalytic treatment of a hydrocarbon-containing feedstream to provide an aromatics enriched product (i.e., a product comprising an aromatics content that is greater than in the feedstream).

An "aromatic" compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds, e.g., benzene, toluene, and xylenes) and "heteroarenes" (heteroaromatic compounds formally derived from arenes by replacement of one or more methine (—C=) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)).

As disclosed herein, the term "substituted" may be used to describe an aromatic group, arene, or heteroarene, wherein a non-hydrogen moiety formally replaces a hydrogen atom in the compound, and is intended to be non-limiting, unless specified otherwise.

The term "binder", particularly as used in the term "catalyst binder", refers to materials that are typically a solid with a high pore volume and surface area, to which catalyst materials may be mixed. The binder may be inert or acidic or basic in nature and may participate in the catalytic reactions, and improve crush strength of the catalyst upon calcination, as the name implies. Typical catalyst binders include various kinds of carbon, alumina, silica, and silica-alumina, e.g., amorphous silica aluminates, zeolites, alumina-boria, silica-alumina-magnesia, magnesium aluminum hydrate, silica-alumina-titania and materials obtained by adding other zeolites and other complex oxides thereto.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. Zeolites, crystalline aluminophosphates and crystalline silicoaluminophosphates are representative examples of molecular sieves. Non-limiting representative examples of silicoaluminophosphates include SAPO-11, SAPO-31, and SAPO-41.

"Zeolite" generally refers to an aluminosilicate having an open framework that allows for ion exchange and reversible dehydration. A large number of zeolites have been found to be suitable for catalysis of hydrocarbon reactions. Non-limiting representative examples include L-zeolite (also referred to as zeolite L), Y-zeolite (or zeolite Y), ultrastable Y zeolite or ultrastable zeolite Y (often abbreviated as USY zeolite), zeolite beta, ZSM-5, ZSM-11, ZSM-12, ZSM-22, ZSM-23, ZSM-34, ZSM-35, ZSM-38, ZSM-48, ZSM-50, and ZSM-57. Zeolites may include other metal oxides in addition to the aluminosilicate, in the framework structure.

"Group IIA" or "Group IIA metal" refers to beryllium (Be), magnesium (Mg), calcium (Ca), strontium (Sr), barium (Ba), radium (Ra), and combinations thereof in any of elemental, compound, or ionic form.

"Group IIB" or "Group IIB metal" refers to zinc (Zn), cadmium (Cd), mercury (Hg), and combinations thereof in any of elemental, compound, or ionic form.

"Group IVA" or" "Group IVA metal" refers to germanium (Ge), tin (Sn) or lead (Pb), and combinations thereof in any of elemental, compound, or ionic form.

"Group VIB" or "Group VIB metal" refers to chromium (Cr), molybdenum (Mo), tungsten (W), and combinations thereof in any of elemental, compound, or ionic form.

"Group VIII" or "Group VIII metal" refers to iron (Fe), cobalt (Co), nickel (Ni), ruthenium (Ru), rhodium (Ro), palladium (Pd), osmium (Os), iridium (Ir), platinum (Pt), and combinations thereof in any of elemental, compound, or ionic form.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

The term "monofunctional" generally refers to "nonacidic" catalysts that have a metallic function but do not have an acidic function in reforming reactions. Such catalysts are contrasted with conventional bifunctional reforming catalysts that have both an acidic function and a metallic function. The term "non-acidic" is understood in the art, particularly due to the contrast between monofunctional (non-acidic) reforming catalysts and bifunctional (acidic) reforming catalysts, and refers to catalysts characterized by an absence (or substantial absence) of accessible acid sites. The substantial absence of accessible acidic sites can be inferred from the reforming reaction products or determined by various analytical techniques well known in the art. For example, certain bands in O—H stretching region of infrared spectrum of the catalyst can be used to measure the number of acid sites that are present. One method of achieving nonacidity is by incorporating alkali and/or alkaline earth metals in the L-zeolite, and preferably is achieved, along with other enhancement of the catalyst, by exchanging cations such as sodium and/or potassium from the synthesized L-zeolite for alkali or alkaline earth metals. Preferred alkali or alkaline earth metals for exchange include potassium and barium. According to one technique, a substantially non-acidic support material has a low (i.e., less than about 0.1) relative n-hexane cracking activity of the support compared to a standard silica/alumina catalyst, as determined in the Alpha Test described in U.S. Pat. No. 3,354,078 and in the journal "Catalysis," Vol. 4, p. 527 (1965); Vol. 6, p. 278 (1966); and Vol. 61, p. 395 (1980).

"Predominantly naphtha fraction" generally refers to a hydrocarbon composition that is predominantly comprised of a C5 to C9 fraction, and more particularly, where specified, a predominantly C6 to C8 fraction. The term "predominantly" is used in the normal sense, i.e., that fraction which is the largest (most) in the composition.

"LHSV" refers to "liquid hourly space velocity" and is a conventional term in reactor science and engineering meaning the ratio of liquid volume flow per hour to catalyst volume (hr−1) or reactor volume (hr−1). LHSV is inversely proportional to residence time.

"WHSV" refers to "weight hourly space velocity" and is a conventional term in reactor science and engineering meaning the ratio of weight flow rate per hour to catalyst weight (hr−1). The Catalyst weight includes the weight of the zeolite as well as the catalytic metals. WHSV is inversely proportional to residence time.

The Periodic Table of the Elements refers to the version published by the CRC Press in the CRC Handbook of Chemistry and Physics, 88th Edition (2007-2008). The names for families of the elements in the Periodic Table are given here in the Chemical Abstracts Service (CAS) notation.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

General Description of Representative Processes and Catalysts

In one embodiment, the application pertains to a process for forming aromatic hydrocarbons from a hydrocarbonaceous feed stream. The process generally comprises contacting a feed stream comprising a naphtha fraction having a $C_6$ to $C_8$ content with a catalyst bed composition. The specific composition of the feed stream may vary depending upon available feeds, desired products, type of catalyst, desired products and the like.

Generally, the feedstream $C_6$ to $C_8$ content may be at least about 60 vol %, or at least about 70 vol. %, or at least about 80 vol. %, or at least about 90 vol. %, or at least about 95 vol. %, or at least about 98 vol. %, or at least about 99 vol. %. The feedstream $C_6$ to $C_7$ content may be at least about 60 vol %, or 70 vol. %, or 80 vol. %, or 90 vol. %, or 95 vol. %, or 98 vol. %, or 99 vol. %. The feedstream may comprise less than about 100 ppb, or less than about 50 ppb, or less than about 30 ppb, or less than about 20 ppb, or less than about 10 ppb, or less than about 5 ppb, or less than about 2 ppb, or less than about 1 ppb sulfur. The feedstream may comprise less than about 100 ppm water, or less than about 50 ppm, or less than about 30 ppm, or less than about 20 ppm, or less than about 10 ppm, or less than about 5 ppm, or less than about 2 ppm, or less than about 1 ppm water. Typically, $H_2$ is contacted with the feedstream prior to, simultaneous with, or after heating. If desired, the process may include co-feeding $H_2$ to reduce coking and may generally be operated at an $H_2$ to feedstream hydrocarbon mole ratio, i.e., $H_2$:HC, of between about 0.5 to 3, or about 0.5 to 2.5, or about 1.0 to 2.0.

The catalyst bed composition employed herein is one that is effective to form aromatic hydrocarbons by catalytic reforming of the feed stream hydrocarbons in the presence of sufficient heat to reform the feed stream hydrocarbons to form aromatic hydrocarbons. The catalyst bed composition generally comprises a plurality of cylindrical pellets, each pellet comprising a Group VIII metal on L-zeolite wherein the plurality of cylindrical pellets is characterized by: (a) a plurality of holes passing through the length of the cylindrical pellets, (b) a dome-shaped top and bottom, and (c) a plurality of semi-circular grooves along the length of the exterior of the cylinder.

The size, shape, and number of the plurality of holes passing through the length of the cylindrical pellets may be the same or different for each hole and may vary depending upon the reaction conditions and equipment employed. The size and shape of the hole may vary over the length of the hole through the pellet. In some embodiments the size and shape of each hole is relatively uniform and the shape is, in some embodiments, a circle so that the holes are cylindrical through the core along the length of the pellet. In some embodiments, there are an odd number of holes with one hole substantially in the center and in some embodiments, there are seven holes passing through the cylindrical catalyst pellet wherein one hole is substantially in the center, and the other holes surround it. In some embodiments the plurality of holes have substantially the same diameter.

The plurality of cylindrical pellets may also be characterized by a generally dome-shaped top and/or bottom. That is, there is a hemispherical or substantially hemispherical shape on the top and/or the bottom the pellet. The specific shape and size of either dome may vary depending upon the catalyst, feedstock and reaction conditions. In some embodiments, the dome height of the dome-shaped top and/or the dome-shaped bottom is 15 percent or less, or 12.5 percent or less, or 10 percent or less, or 5 percent or less of the cylinder height of the catalyst pellet irrespective, i.e., not counting, the height of the dome-shaped top or bottom on the pellet. The wall thickness surrounding a hole, in the plurality of holes, may vary. This is important to preserving crush strength of the catalyst, since the pellet is likely to break at its' weakest point. In some embodiments, minimum wall thickness at any point is greater than about 11 percent of the diameter of the generally cylindrically shaped catalyst pellet.

The plurality of cylindrical pellets may also be characterized by a plurality of grooves along the length of the exterior of the cylinder. The grooves may vary in number and shape, depending upon a number of factors. In some embodiments the grooves are the same or different shapes, and in some embodiments, the grooves are substantially semi-circular. In some embodiments it may be advantageous to have from 4 to 8 grooves, or about 6 grooves. In some embodiments, it may be desirable to have 6 grooves. In some embodiments, it may be desirable that there are semi-circular grooves and cylindrical holes wherein one or two or three or four or five or six or more of each have substantially the same diameter.

Some embodiments of the process may include containing at least a portion, up to all of the catalyst pellet composition, within, for example, heater tubes of a reactor furnace. In such embodiments, the reactor furnace may, for example, be top-fired, side-fired, or terrace-fired, or an arbor or inverted-arbor design. Depending upon a number of factors, it may be advantageous in some cases to provide one or more heater tube feedstream inlets at the top of the heater tubes.

Parameters such as feed rate, inner tubewall temperature, hydrocarbonaceous naphtha feed rate, inlet pressure, peak and average heat flux, oil absorbed heat duty, may vary, depending upon the application and other parameters. In some embodiments, the inner tubewall temperature may be controlled over the range of 500° C. to 550° C. In some embodiments, hydrocarbonaceous naphtha feed rate may be as high as 50,000 to 65,000 kg/hr per m2 of tube inside cross sectional area. In some embodiments the hydrocarbonaceous feedstock tube inlet pressure may be as high as 215 prig. The peak heat flux across the tube wall of a top fired heater may be as high as 150 KW/m2 in some embodiments and the average heat flux over the length of the heater tube may vary over the range of 50-85 KW/m2. In some embodiments the oil absorbed heat duty for a 12-meter long X four-inch tube may be as high as 285 KW and the oil absorbed heat duty for a 12-meter long X five-inch tube may be as high as 370 KW. The amount of heat used depends upon many factors including, for example, the specific reactor, catalyst, feed, and other conditions employed. In some embodiments a radial temperature gradient from a heater inside tube wall to the center of the heater tube in the feed entry zone may be less than about 200° C., or less than about 100° C. In some embodiments, a radial temperature gradient from a heater inside tube wall to the center of the heater tube in the reactor effluent exit zone may be less than about 50° C., or less than 20° C.

If heater tubes are employed then they may comprise an entry zone, a middle zone and an exit zone. In some embodiments the entry zone may be from about 10-30% of the linear length of the tubes while the middle zone may be about 40-80% of the linear length of the tubes, and the exit zone may be from about 10-30% of the linear length of the tubes. In some cases, the catalyst may be graded by pellet size, with smaller diameter cylindrical catalyst pellets in the entry zone, medium size cylindrical catalyst pellets in the middle zone, and larger size cylindrical pellets in the exit zone. Of course, the specific sizes of the small, medium, and larger size pellets may be selected based on other parameters of the reaction and desired results. In other cases, the catalyst may be graded by activity, with fresh catalyst pellets in the entry zone, some combination of fresh and regenerated catalyst in the middle zone, and all regenerated catalyst in the exit zone. In some cases, the catalyst may be graded by platinum loading and penetration, with higher platinum loading and deeper penetration inside the cylindrical pellet in the entry zone, medium platinum loading and moderate penetration inside the cylindrical pellet in the middle zone, and lower platinum loading and lower penetration inside the cylindrical pellet in the exit zone.

In one specific embodiment, a catalyst bed composition may be employed that comprises a plurality of cylindrical platinum FKL or KL catalyst pellets. One or more of the plurality of cylindrical platinum FKL catalyst pellets is characterized by: (a) seven cylindrical holes passing through the length of the cylindrical pellets wherein one of the seven cylindrical holes is located in the center, (b) a dome-shaped top and bottom wherein each of the dome height of the dome-shaped top and the dome-shaped bottom is 12.5 percent or less of the cylinder height of the catalyst pellet, irrespective of the dome-shaped top and bottom on the pellet, and/or (c) a plurality of semi-circular grooves along the length of the exterior of the cylinder wherein the diameter of the plurality of semi-circular grooves is within 10% of the diameter of each of the seven cylindrical holes. If desired, any of the aforementioned catalyst compositions may further comprise mesoporous neutral silica or alumina or basic magnesium alumina hydrate or combination thereof.

Specific Representative Embodiments

Preferred Catalysts

Preferred catalysts for use in the present invention comprise non-acidic L-zeolite catalysts, wherein exchangeable ions in the L-zeolite, such as sodium and/or potassium, have been exchanged with alkali or alkaline earth metals. A particularly preferred catalyst is Pt Ba L-zeolite, wherein the L-zeolite has been ion-exchanged using a barium containing solution. Combinations of catalysts may be used as well, such as Pt/FKL and Pt/KL, both fresh and regenerated, particularly comprising such L-zeolite catalysts.

Catalysts suitable for use in the invention, and/or having features that are beneficial in forming aromatic hydrocarbons, as well as methods of making such catalysts, are described in more detail in the patent literature. See, e.g., U.S. Pat. Nos. 4,104,320; 4,424,311; 4,435,283; 4,447,316; 4,517,306; 4,456,527; 4,681,865; 5,091,351; 5,879,538; 6,004,452; 6,063,264; U.S. Pub. No. 2018/0170837A1; and EP Pub. Nos. 201856A, 403976, and 498182A. Details for L-zeolite catalysts as described in these patents are useful for the reforming catalyst of the present invention.

The Group VIII metal of the catalyst of the present invention is preferably a noble metal, such as platinum or palladium. Platinum is particularly preferred. Preferred amounts of platinum are 0.1 to 5 wt. %, more preferably 0.1 to 3 wt. %, and most preferably 0.3 to 1.5 wt. %, based on L-zeolite.

The alkaline earth metal used herein generally refer to the Group IIA elements beryllium, magnesium, calcium, strontium, barium, and radium, with barium, strontium and calcium preferred, and barium more preferred.

One method of making non-acidic L-zeolite catalyst is by incorporating alkali and/or alkaline earth metals in the L-zeolite, and is preferably achieved, along with other enhancement of the catalyst, by exchanging cations such as sodium and/or potassium from the synthesized L-zeolite using alkali or alkaline earth metals. Preferred alkali or alkaline earth metals for exchange include potassium and barium.

As used herein, the terms "L zeolite", "zeolite L" and "Type-L zeolite" are used synonymously to refer to LTL type zeolite. The L-zeolite component of the catalyst is described in published literature, such as U.S. Pat. Nos. 3,216,789 and 6,063,264. The chemical formula for L-zeolite may be represented as follows: (0.9-1.3) M2/nO : Al2O3 (5.2-6.9) SiO2:yH2O wherein M designates a cation, n represents the valence of M, and y may be any value from 0 to about 9. Zeolite L, its X-ray diffraction pattern, its properties, and method for its preparation are described in detail in U.S. Pat. No. 3,216,789. Zeolite L has been characterized in "Zeolite Molecular Sieves" by Donald W. Breck, John Wiley and Sons, 1974, (reprinted 1984) as having a framework comprising 18 tetrahedra unit cancrinite-type cages linked by double six rings in columns and cross-linked by single oxygen bridges to form planar 12-membered rings. The hydrocarbon sorption pores for L-zeolite are reportedly approximately 7 Å in diameter.

The various zeolites are generally defined in terms of their X-ray diffraction patterns. Several factors affect the X-ray diffraction pattern of a zeolite, including, e.g., temperature, pressure, crystal size, impurities and type of cations present. As the crystal size of the type-L zeolite becomes smaller, the X-ray diffraction pattern becomes somewhat broader and less precise. Thus, the terms "L-zeolite" and "zeolite L" includes any of the various zeolites made of cancrinite cages having an X-ray diffraction pattern, substantially the same as the X-ray diffraction patterns shown in U.S. Pat. No. 3,216,789. Type-L zeolites are conventionally synthesized in the potassium form, that is, in the theoretical formula previously given; most of the M cations are potassium. M cations are exchangeable so that a given L-zeolite, for example, a type-L zeolite in the potassium form, can be used to obtain type-L zeolites containing other cations by subjecting the L-zeolite to ion-exchange treatment in an aqueous solution of an appropriate salt or salts. However, it is difficult to exchange all the original cations, for example, potassium, since some cations in the zeolite are in sites that are difficult for the reagents to reach. Preferred L-zeolites for use in the present invention are those synthesized in the potassium form. Preferably, the potassium form L-zeolite is ion exchanged to replace a portion of the potassium, most preferably with an alkaline earth metal, barium being an especially preferred alkaline earth metal.

The AROMAX® reaction makes use of a mono-functional catalys—platinum on L-zeolite. Any acidity in the L-zeolite is neutralized by ion exchange with an alkaline metal, such as Ba. First generation AROMAX® I catalyst is referred to as Pt/KL. L-zeolite facilitates the adsorption of n-hexane and suppression of coke formation resulting in a high catalyst stability. AROMAX® II is a subsequent generation of reforming catalysts that further improved ARO-MAX® I catalyst. AROMAX® II catalyst is sometimes referred to as Pt/FKL zeolite. These two catalysts both enable two classes of reactions: dehydrogenation (such as cyclohexane to Benzene) and dehydrocyclization (n-hexane to Benzene). The dehydrogenation reaction is very fast and product yields are equilibrium limited (aromatics formation favored at high temperature and low pressure) whereas dehydrocyclization of paraffin to aromatic is moderately fast (with limitations being space velocity, diffusion and heat transfer).

A comparison of catalyst performance for AROMAX® I and II catalysts with conventional Pt on chlorided alumina type Rheniforming catalyst is shown below, illustrating the greater benzene and hydrogen yield differences between AROMAX® and conventional Pt/Al2O3 catalyst for an n-hexane feed. The data in Table 1 underscores the lower C1-C4 yield and particularly, the great difference in selectivity for aromatics over competing cracking products (C1-C4) for AROMAX® II catalyst relative to AROMAX® I and conventional reforming catalysts. The high benzene yield provided by AROMAX® catalysts is accompanied by a high yield of hydrogen and hydrogen purity. A further benefit is that Hydrogen recovery tends to be high due to low C1-C4 yield and no presence of carbon oxides such as carbon monoxide.

TABLE 1

|  | AROMAX ® II (Pt/FKL) | AROMAX ® I (Pt/KL) | Pt on Chlorided Alumina |
|---|---|---|---|
| Benzene | 81.4 | 74.5 | 21.6 |
| C7+ Aromatics | 0.1 | 0.1 | 7.2 |
| Hydrogen | 8.1 | 7.6 | 1.2 |
| C1-C4 | 6.2 | 11.2 | 39.5 |
| C5+ paraffinic Selectivity: | 4.2 | 6.5 | 30.5 |
| Aromatics/ (C1-C4) Yield | 13.1 | 6.6 | 0.73 |

1 reproduced from Fukunaga and Katsuno, Catal Surv Asia (2010), 14:96-102
2 Reaction conditions: 500° C.; 0.6 MPa, WHSV = 2, and H2/HC mole ratio = 5 for a pure n-hexane feed Table 2 compares AROMAX® I and AROMAX® II catalysts at high LHSV. At high LHSV, AROMAX® II catalyst selectivity for aromatics over C1-C4 light paraffin is improved compared to AROMAX® I catalyst. Operating with AROMAX® II catalysts at high space velocity is therefore particularly attractive since even if a portion of a normal paraffin feed remains unreacted due to high space velocity in the reactor, any unreacted feed (e.g., n-Hexane) can be recycled rather than be cracked into lighter hydrocarbons.

TABLE 2

|  | AROMAX ® II (Pt/FKL) | AROMAX ® I (Pt/KL) |
|---|---|---|
| Conversion, wt % Selectivity: | 14.2 | 2.2 |
| Aromatics/(C1-C4) Yield | 20.7 | 8.6 |

1 reproduced from Fukunaga and Katsuno, Catal Sury Asia (2010), 14:96-102
2 Reaction conditions: 480° C.; 0.6 MPa, WHSV = 80, and H2/HC mole ratio = 5 for a pure n-Hexane feed One aspect of the present application that distinguishes it from prior AROMAX® and naphtha reforming systems and processes is the use of catalyst pellet size and shape not previously used in such applications, wherein the catalyst is shaped as a cylinder with an aspect ratio (height to diameter) of approximately 0.5 to 1.50, with multiple holes inside the cylindrical catalyst ranging from four to ten, which can be of the same or different sizes, and may have multiple semi-circular flutes or grooves or lobes cut along the circumference of the cylinder, with the circular top and bottom ends of the pellet shaped as domes. The pellets are loaded inside the heater tubes of a reactor furnace.

The terms "multi-holed, multi-grooved pellet" in relation to catalyst pellets is known in the art and generally refers to an extruded cylindrical catalyst with multiple circular holes cut all the way through the cylinder height for gas to pass through, facilitating heat and mass transfer. Cylindrically-shaped catalysts with multiple holes and circumferential grooves are carefully selected to enhance packed bed void fraction, which is needed to meet bed pressure drop constraint in an axial flow reactor. The holes and grooves have a second purpose to enhance heat and mass transfer, minimize intra-particle temperature gradient, improve catalyst effectiveness factor and facilitate good platinum utilization. The dome shapes at the top and bottom ends of the catalyst pellets are intended to prevent chipping of sharp edges on the catalyst pellet and distribute compressive forces, catalyst bed weight and gas flow. These catalyst pellets are made out of L-zeolite and other binder materials that offer a porous structure for mass and heat to diffuse into and out of the pellet, provides structural integrity to the pellet over the life of the catalyst, and facilitate uniform deposition of Platinum and other catalytic metals throughout the support.

Examples of the large wagon-wheel, multi-holed and Quadralobe catalyst pellets and their preparation and application in steam-methane reforming to produce Hydrogen gas are numerously described throughout the art and illustrated, for example, in Rostrup-Nielsen, Catalytic Steam Reforming, reprint from CATALYSIS -Science & Technology, edited by Anderson and Boudart, Volume 5, Springer Verlag, Berlin, Heidelberg, 1984 and Franczyk et al (Chemical and Process Engineering, 2015, 3692), pg. 239-250.

The reforming furnace reactor system generally comprises heater tubes with a catalyst contained within the heater tubes of the furnace. The heater tubes are typically made from a corrosion resistant material, preferably stainless steel, and are optionally coated or treated with a corrosion or carburization inhibitor, preferably comprising an interior layer of tin. While any known furnace reactor tube configuration may be used, preferably the furnace comprises multiple parallel reactor tubes, e.g., in tube configurations such as those described in U.S. Pat. No. 6,063,264. Preferably the tubes are positioned vertically so feedstock enters from the top of the reactor tubes and product leaves from the bottom of the reactor tubes. Although coiled or curved tubes may be used, the reactor tubes are typically straight, rather than having a coiled or curved path through the furnace. The tubes may have a cross section that is circular, elliptical, rectangular, and/or other known shapes. While the tubes have a cross-sectional size to minimize cross-sectional temperature gradients, decreasing the cross-sectional size of the tubes increases the number of tubes required for a given production rate and imposes additional challenges of uniform feed distribution over such a large number of tubes. Tube size is therefore advantageously set to minimize cross-sectional temperature gradients while also minimizing cost of construction. While not limited thereto, suitable cross-sectional tube diameters may be from about 2 to 8 in., preferably from about 2 to 6 in., and more preferably from about 4 to 5 in. The heater tubes are typically sized for a feedstream flowrate through the heater tubes at an WHSV between about 1 to 15 hr-1, more particularly about 6 to 15 hr-1, or about 8 to 12 hr-1.

The tubes may be heated with any burner type known in the art, such as ceiling or top-fired, wall or side-fired, terrace-fired, arbor or inverted arbor designs, and floor mounted burners. Preferably the burners are positioned to provide heat flux near the reactor tube inlet that is greater than heat flux near the exit of the reactor tubes. If the reactor tubes are vertically oriented, the burners are preferably positioned near the top inlet of the reactor tubes having flames burning in a downward direction along the length of the tubes. Orienting the burners near the top of the vertical reactor tube and firing downward provides heat flux near the reactor tube inlet (top) that is greater than the heat flux near the reactor tube outlet. Higher heating is desired near the reactor tube inlet to provide the heat of reaction and heat required to heat feedstock to the desired reaction temperature. Sufficient spacing should be provided between burners and tubes to prevent hot spots. Burners are typically arranged on both sides of the tubes and tubes may be typically separated by 0.25 to 2.0 tube diameters to provide uniform heating of the tubes.

Generally, less heat transfer from across the tube-wall is desired near the outlet of the heater tubes. To avoid higher temperatures that might promote undesired coking and/or cracking conditions, the reactor furnace may optionally also comprise one or more shields or coffin box positioned to block at least a portion of the burner flame heat from an outlet portion of the tubes. If the reactor tubes are vertically oriented with a down-firing burner, at least one shield may be positioned to block a portion of flame radiation from a bottom portion of the reactor tube.

In one embodiment of the present application, it has been discovered that steam methane reforming (SMR) furnace may be re-purposed for loading Pt on L-zeolite catalyst directly inside fired heater tubes for naphtha aromatization. SMR is generally robust and reliable technology in spite of severe operating conditions. The operational reliability expected from the instant naphtha aromatization process may be comparable to that of a SMR process, since both processes produce significant volumes of Hydrogen. Since hydrogen production is usually highly endothermic, heat transfer is often a key constraint. A large amount of endothermic heat of reaction may need to be transferred to drive an SMR reaction. Doing this in a furnace, across the tube wall, may be very efficient as it could dramatically shrink the size of the reactor that is needed. This has been discovered to be applicable to LNAR (light or medium naphtha aromatization) since the reaction is equally endothermic even though the operating conditions are in some cases, less severe.

FIG. 1 is a typical heat profile chart for a representative five-inch diameter×12 meter long tube in a multi-tubular top-fired SMR Furnace Reactor containing multi-holed, multi-grooved extruded ceramic pellets with Nickel catalyst loaded on the pellets. The furnace tubes may be made of specialized high nickel, high chrome metallurgy (operating at 900° C.). This configuration, with all burners located at the top of the furnace with flame pointed downward, may be capable of transmitting large radial heat fluxes (as high as 125 KW/m2.K, as seen in the figure) from the fireside, across the tube wall, to the inside of the tubes, notwithstanding the very high bulk process fluid operating temperatures (530-830° C.). The heat flux is often at peak values for the first twenty percent of the length down the tube and gradually declines to 25% of peak heat flux towards the exit. This heat flux profile of top-fired configuration often matches the process need, since initially, reaction rates inside the tube are very high and gradually decline as the reaction reaches equilibrium.

A high GHSV (50,000-100,000 hr−1), turbulent gas flow down the tube packed with catalyst promotes good convective mixing inside the tubes, facilitating very good radial heat transfer. A typical 1/16-inch extrudate catalyst shape and size usually employed in adiabatic radial flow reactors in the refining and chemical industry may not be suitable for the axial flow furnace reactor due to excessive tube side pressure drop. Thus, a multi-holed, multi-grooved large (10 mm to 25 mm diameter) cylindrical pellet shape with an aspect ratio (Height/Diameter ratio) close to unity and comparatively higher void fraction may be employed for good heat transfer as well as lower pressure drop, in this axial flow service. Advantageously, this can facilitate the use of fewer but larger diameter tubes.

The catalyst pellet shape and size have been discovered to be responsible in part for the following benefits:

Good convective mixing of the down-flowing gases inside the tube, enabling high overall heat transfer coefficient (~1000-2000 W/m2/K) across the tubewall.

Presence of active catalyst inside the tube may quench the tube wall. This could have direct bearing on tube metallurgy and tube life. It could simplify tube metallurgy requirement to a lower alloy stainless steel, eliminate the need for tin or other coating to prevent carburization, and reduce the allowance for tube creep and thermal stresses on the tube and catalyst pellets. This in turn can simplify the design of the top and bottom pigtails needed for each furnace tube. The cool tubewall, in turn, may protect the catalyst pellets next to the wall from getting deactivated by coke deposition, contributing to a virtuous cycle.

The catalyst shape may also provide the mechanical strength to carry the weight (approximately 65 kg) of a large column of catalyst under pressure (as high as 2.5 MPa) without getting crushed. The designed catalyst shape may facilitate maximizing bed void fraction (60-65%), thereby minimizing packed bed pressure drop. This may make an axial flow reactor work even though in many cases adiabatic naphtha reforming is practiced in a radial flow reactor configuration.

The many holes inside the pellet and grooves on the outside of the pellet may increase the external surface area of the pellet per unit volume which may improve catalyst effectiveness factor.

One characteristic of the top-fired configuration is that the tube metal temperature profile stays relatively flat across the 12-meter length of the tube, as can be seen in the FIG. 1. The bulk fluid temperature rises gradually through the length of the heater tube and approaches within 50° C. of the tube metal temperature at the exit. The SMR process fluid enters at the top of the furnace tube at 2.4 MPa. Typically, the feed rate per tube is set to deliver around 250-370 KW of oil absorbed duty per tube, depending on tube diameter, culminating in a reliable and compact furnace reactor design. At the selected feed inlet pressure and feed rate, the axial pressure drop per 12-meter tube is only around 15-20 prig (clean). This is a consequence, of high system operating pressure and also design of catalyst size and shape yielding a high bed void fraction, ranging from 0.60 to 0.65.

FIG. 1 represents the performance of a single 5-inch tube. SMR furnace reactors currently often utilize 4 and 5-inch ID tubes. 5-inch ID tubes allow more catalyst to be loaded, resulting in fewer tubes and lower pressure drop per tube, but at the cost of a higher radial temperature gradient across the tube and higher tubewall temperature. Radial heat fluxes ranging from 140-20 KW/m$^2$ are quite common in top-fired SMR furnace reactors. This implies 250-370 KW of heat transferred across the length of a single heater tube. Multi-tubular SMR furnace reactors may be heat transfer limited rather than catalyst volume limited. Some SMR reactors may contain a large excess of catalyst volume and the catalyst effectiveness factor may be much lower than 0.1. The SMR reaction may approach equilibrium halfway down a catalyst-filled tube. As catalyst deactivates over the course of a run, equilibrium may shift further down the tube.

It has been discovered that LNAR furnace reactor may behave in a similar way to SMR furnace reactors. Each heater tube could be a parallel reactor and supplied with naphtha feed and recycle hydrogen out of a feed header system. A typical LNAR plant of this invention may need no more than 100-500 tubes and thus the hydrogen and naphtha feed distribution and product gathering system are less complex compared to other such inventions with over a thousand tubes. To reduce capital cost and make the reactor more compact, the catalyst may be disposed in 12-meter long×4 to 5 inch ID tubes. This could help minimize the number of required tubes. Economics often favors fewer but longer and larger diameter tubes.

The burner heat input will often be controlled to maintain a flat, tube metal temperature profile, albeit at 550° C. instead of the 900° C. required for SMR. The peak heat flux could occur in the entry zone where reaction rates are highest. Since reaction kinetics may be slower than SMR due to the lower reaction temperature and some of the reactions may not be equilibrium-limited, the peak heat flux may decline more gradually over the length of the tube. The multi-tubular furnace reactor may be adapted to Light Naphtha Aromatization considering optimum or near optimum operating conditions to achieve a robust and/or reliable furnace reactor configuration. Simultaneous reactions may be occurring inside the tubes. A feedstock or desulfurized light naphtha may comprise n-hexane, methyl pentanes, methyl cyclopentane, cyclohexane, benzene, some $C_5$ and $C_7$ paraffins and/or hydrogen. A target product is often benzene. Undesirable products may include coke and cracked paraffin products such as methane, ethane, propane and/or pentanes. It is sometimes better to leave feed hexanes unreacted than have them cracked to light ends. The target hexanes conversion in some embodiments is 80% or more and target benzene selectivity may be 80% or more. Often unconverted hexanes in the reactor effluent may be recovered during product fractionation and benzene extraction steps and recycled back to feed inlet, if desired.

Reaction Temperature There are numerous benefits to carrying out the reaction at as low a temperature as possible, subject to practical considerations of reactor size. The reactor temperature may be adjusted to meet a target hexanes conversion. In the adiabatic reactor configuration, the naphtha aromatization reactions may occur in the 426 to 607° C. range. The hot feed leaving the fired heater can enter the radial flow reactor at 607° C. and exits the reactor, partially to fully quenched by the endothermic heat of reaction, at about 426° C. In the case of the furnace reactor, the reaction conditions may be closer to isothermal with a temperature gradient from tube wall to tube center. Undesirable side reactions such as Hydrocracking of the Methyl Pentanes in the feed may have to be controlled. The Dehydrogenation of Methyl Cyclopentane and Cyclohexane to Benzene is usually fast and may not be the constraint in setting catalyst volume. Selectivity to Benzene (over light ends) is typically higher at lower temperatures and higher space velocity. The optimum reaction temperature is typically around 500° C. to balance many effects and may achieve about a 80-90% Hexanes conversion. With a top-fired furnace, the tube wall temperature can be controlled by controlling heat input to the fireside. Controlling tube wall temperature may indirectly control reactor temperature as can be seen in FIG. 1 for SMR and FIG. 3 for LNAR. Reactor feed is preheated and enters the top of the reactor around 450° C. and gradually rises to 500° C. at tube exit. If the maximum tube wall temperature is set at 500° C. at start of run and allowed to rise to 550° C. at end of run, a good span of control may be achieved. The peak radial temperature gradient from tube wall to inside boundary layer is around 50° C. and the peak radial temperature gradient from boundary layer to tube center is yet another 60° C. The radial temperature gradients gradually decline as the reaction progresses and shrinks to 10° C. and 10° C. respectively at the exit of the reactor tube. By setting the upper bound for tube wall temperature at 550° C., low grade stainless steel such as 310 S, may be employed for tube metallurgy. This further avoids the need for expensive inside tube coating with tin or other metal to prevent carburization or metal dusting. It also puts less stress on the tube as far as metal creep is concerned and enables longer tube life.

Figure 3:
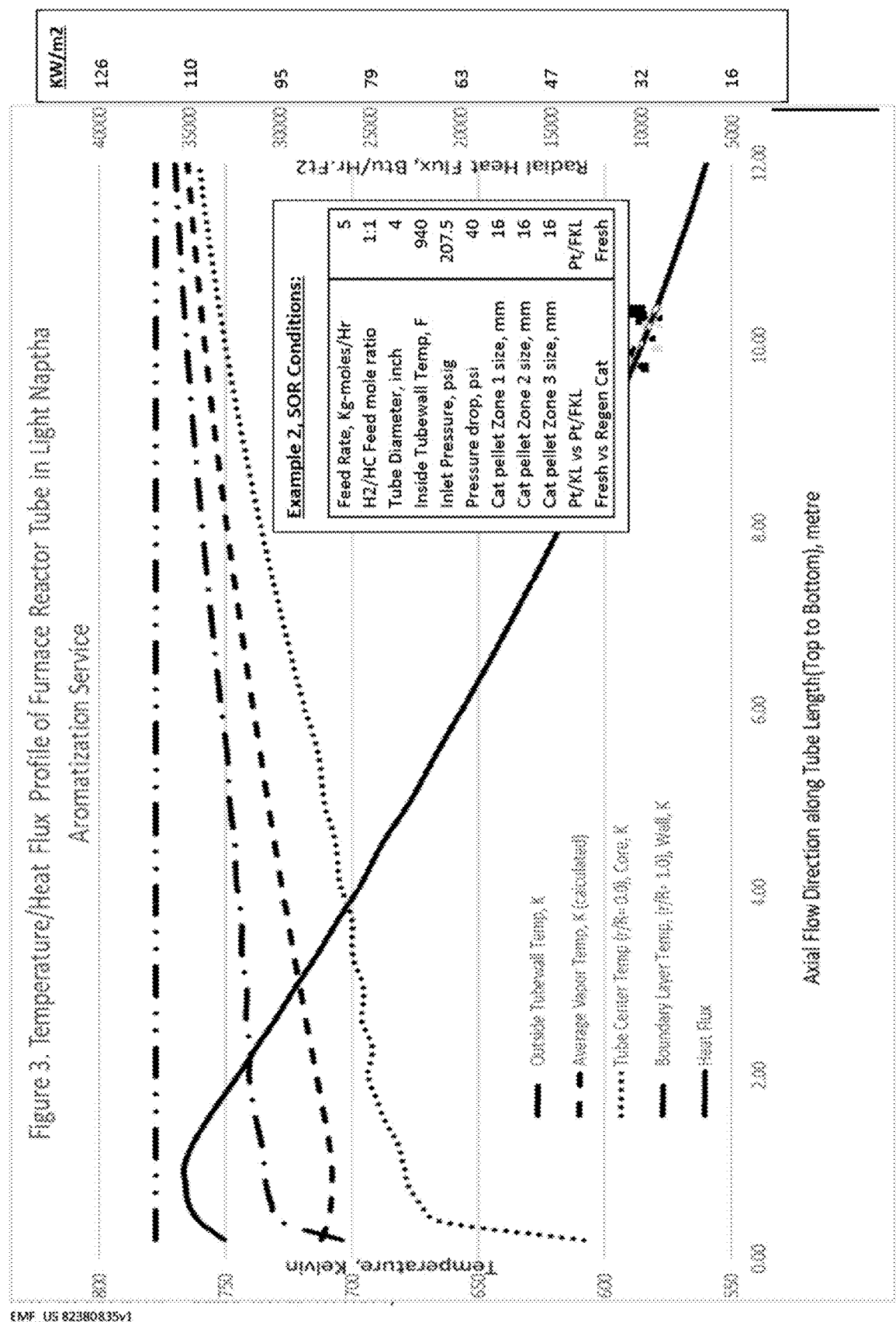
FIG. 3 is temperature/heat flux profile for light naphtha aromatization.

Radial Heat Transfer Compared to other catalyst systems, the multi-holed, multi-grooved catalyst system does a remarkable job of radial heat transfer, keeping the tube inlet radial temp difference from tube wall to boundary layer to 50° C. and the radial temperature gradient from boundary layer to tube center, yet another 60° C., as can be seen from FIG. 3. These radial differentials shrink steadily to about 10° C. each as the fluid progresses towards the exit. The peak heat flux ranges from as high as 150 KW/m2 to about 100 KW/m2 at the entry zone, steadily declining to 25 KW/m2 or even lower at the exit. The average heat flux, across the tube length, ranges from 80 to 50 KW/m2 and the oil absorbed heat duty ranges from 180 to 370 KW, depending on tubewall temperature, feed inlet pressure, catalyst activity, tube diameter and so on. Achieving high heat fluxes and/or high oil absorbed heat duty per tube reduces the total number of tubes required.

Hydrogen Partial Pressure Hydrogen is generally a co-feed in naphtha reforming processes to maintain a minimum Hydrogen partial pressure to suppress coking reactions, particularly on hot heater tube surfaces. In the adiabatic reactor configuration, the light naphtha aromatization reactions occur in the 607° C. to 426° C. range. Often, once a coke layer is formed, it acts as an insulator, requiring even higher wall temperature, resulting in even more coking at the wall, resulting in a vicious cycle, gradually deactivating the catalyst.

Thermal pyrolysis of feedstock can occur on tubewalls and in and around the thin boundary layer adjacent to the tube wall. Since Hydrogen is produced in the course of the reaction, the lowest Hydrogen partial pressure usually occurs in the feed entry zone. Further, in the top-fired configuration, the highest tube wall temperatures usually occur in the feed entry zone, at the top of the furnace. Therefore, the Hydrogen: Hydrocarbon molar feed ratio in the feed entry zone should provide adequate Hydrogen partial pressure protection to suppress coking at the tube wall. Thermal pyrolysis simulation of the hydrocarbonaceous naphtha feed with feed H2:HC molar ratio in the range of 1:1 and 2:1 was carried out at 548° C. to 668° C. to estimate propensity for coke deposition on tubewall and catalyst deactivation due to coking using the SPYRO program. Very low coking rates were noted at these H2:HC feed molar ratios and temperatures. Unlike conventional adiabatic reforming, hydrogen is not needed as a heat carrier into the furnace reactor. Further, unlike the wide 406° C. to 607° C. operating temperature band of the adiabatic reactor, the furnace reactor operates closer to isothermal conditions, with inner tube wall temperature held within a narrow range of 500° C. to 550° C., spanning the SOR to EOR cycle. Furthermore, active catalyst inside the tubes with turbulent flow and vigorous gas mixing inside the tubes may prevent significant coking on the catalyst. While coking is very sensitive to and rises sharply with temperature, at the 500° C. to 550° C. inner tubewall temperature of the target LNAR application, very low coking rates are estimated. This provides assurance that substantially lower H2:HC feed molar ratios, in the range of 1:1 to 2:1, may be sufficient to provide adequate protection for the catalyst in this application. This is substantially lower that prevailing practice in conventional naphtha reforming and prior art on externally heated multi-tubular light naphtha aromatization.

While operating at Hydrogen:Hydrocarbon feed mole ratio higher than 2:1 can help to further suppress coking inside the tubes, higher Hydrogen:Hydrocarbon feed mole ratio may also adversely impact Benzene selectivity, increase pressure drop and incur additional compression cost. An Hydrogen:Hydrocarbon feed mole ratio may be set in the range of 1:1 and 2:1 for this application.

Volumetric Expansion Every mole of feed Hexanes yields four moles of product—three moles of Hydrogen, and one mole of Benzene. Therefore, significant volumetric expansion may occur as the dehydrogenation reaction progresses down the tube. The superficial velocity increases from 1.5 m/sec at tube inlet to 5.0 m/sec at the tube outlet. The GHSV @ STP ranges from 150,000 to 200,000. Packed bed Reynolds Number, in the range of 10000-12000, is very much in the fully developed turbulent flow regime, resulting in good radial mixing. As the superficial velocity increases as reaction progresses down the tube, the tube may be divided into zones and the catalyst and pellet size may be selected as appropriate for each zone.

Reactor Pressure Since the reaction chemistry yields four product moles for every feed molecule, lower pressure operation is thermodynamically favored. That holds for both SMR and LNAR. Nevertheless, SMR reactor may operate at a fairly high pressure of 2.4 MPa for economic reasons. On the other hand, conventional adiabatic naphtha reformers may operate at considerably lower pressures, between 0.35-0.5 MPa. The reactor operating pressure is often a balance of many considerations including feed rate, packed bed pressure drop and heat transfer.

Figure 4:
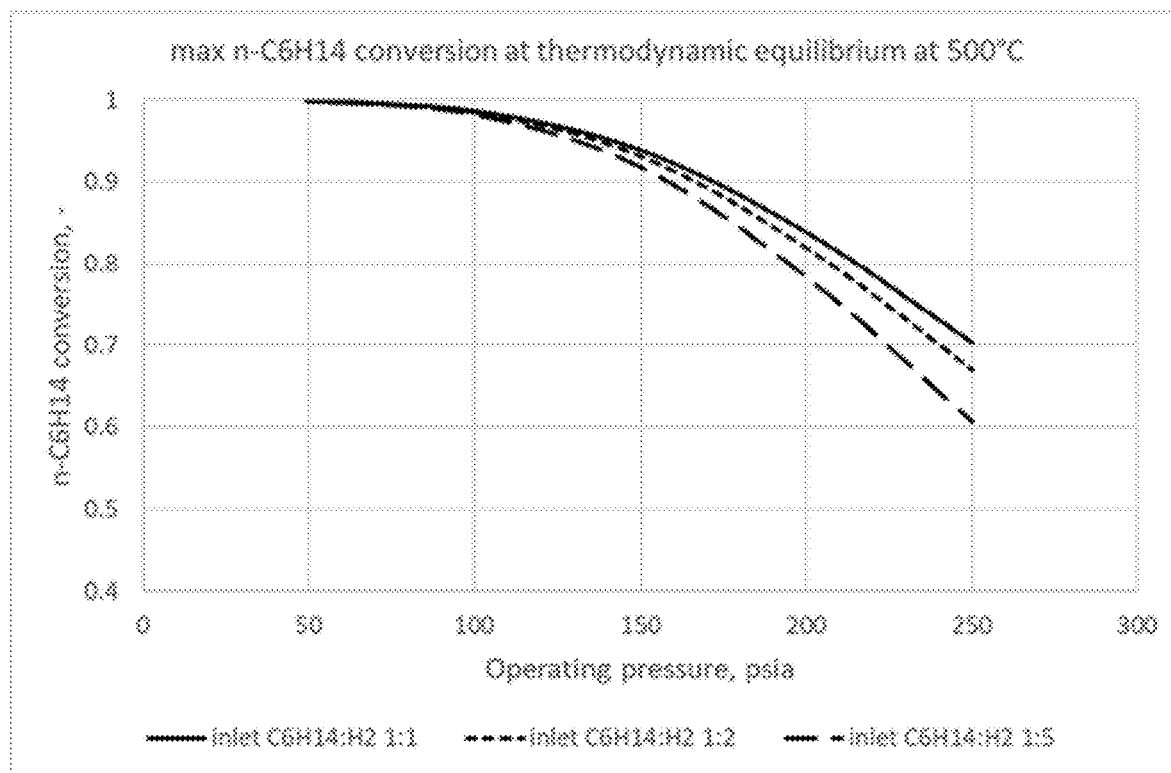
FIG. 4 is effect of pressure on equilibrium conversion of n-Hexane.

Optimum tube outlet pressure for the LNAR furnace reactor may be determined based on a number of factors. Conventional naphtha reforming catalysts are bifunctional in nature, containing both, acid and metal functions that promote both, hydrogenation as well as cracking (which includes coking) reactions. When Naphtha reforming was first introduced, semi-regen reforming units were designed to operate at 2.0 to 2.7 MPa to suppress coke deposition on the catalyst. The downside of high-pressure operation is that, given the acid functionality of the catalyst, the higher hydrogen partial pressure promotes hydrocracking reactions that lead to undesirable cracking of naphtha to light ends. Modern naphtha reforming processes, with improved bimetallic catalysts, often operate at low pressure, to minimize light ends formation. AROMAX® or LNAR catalyst (Pt on KL zeolite), on the other hand, is monofunctional and promotes hydrogenation/dehydrogenation reactions while keeping hydrogenolysis or naphtha cracking to a minimum. The AROMAX® II Pt/FKL zeolite catalyst may further improve this hydrogenation/dehydrogenation activity while suppressing cracking. While lower pressure operation is thermodynamically favorable to aromatics and Benzene selectivity, and for this reason, commercial AROMAX® units can operate at low pressure (0.35 to 0.7 MPa), a moderate pressure operation (1.0 to 1.5 MPa range) is thermodynamically feasible so long as one is not targeting per pass n-Hexane→Benzene conversion above the 90% equilibrium limit, at a reactor tube exit temperature of 500° C. and 1.0 MPa for a 2:1 Hydrogen:Hexane mole ratio in the inlet feed. (See Effect of Pressure on Equilibrium conversion chart shown in FIG. 4). Since the unconverted iso and normal hexanes can be separated from the aromatics product and recycled back to the feed entry zone or utilized in other products, it makes economic sense to increase reactor pressure, lower reaction temperature, increase weight hourly space velocity, if need be, and not target over 80% or 90% per pass conversion. The advantages of operating at 1.0 to 1.5 MPa pressure is that one can squeeze more feed into each tube, operate at Gas Hourly Space Velocity (GHSV) and flow regime similar to SMR, and keep clean tube delta P under 60 psig (0.50 MPa), thereby enabling much higher peak and average heat fluxes and oil absorbed duty per tube, comparable to SMR. Overall, this makes for a compact and robust furnace reactor design. Advantageously, the furnace tube outlet pressure is held at 100-150 psig (0.6 to 1.0 MPa). The feed inlet pressure at the top of the tubes would be set at furnace tube outlet pressure plus tube pressure drop.

Catalyst Shape & Size Multiple internal holes and external flutes are frequently used in SMR catalysts to maximize external surface in the cylindrical pellet. These holes and flutes increase bed void fraction and contribute to lower bed pressure drop. For example, those well-versed in the art know that ten-hole and six-hole SMR pellets as well as four-hole, four-groove Quadralobe SMR catalysts pellets have been commercially deployed. The pellet configuration has to balance competing considerations of bed pressure drop, heat transfer, catalyst effectiveness, and crush strength. Seven equal sized circles inscribed in a larger circle achieves the maximum circle packing density of 0.7777 when compared to alternatives, such as three, four, five, six, eight and higher circle geometries. This is shown in FIGS. 5 A, B, C and D.

This geometric optimum is relevant to cylindrical pellet configuration for balancing bed pressure drop, heat transfer, catalyst effectiveness, and crush strength.

Whereas the four-hole, five-hole and six-hole configurations shown in FIGS. 5A, 5B, and 5C achieve at best a packing density of 0.66 to 0.68, the seven-hole configuration (with one hole in the center and six holes along the periphery) shown in FIG. 5D achieves the highest packing efficiency of 0.7777. Higher packing efficiency enables higher bed void fraction without compromising structural integrity. The targeted crush strength is achieved by specifying a minimum wall thickness surrounding each hole that needs to be preserved wherever two circles or holes come close to each other. Additional surface area and void volume, beyond the seven equal-sized holes, is achieved by adding six grooves along the outer periphery of the catalyst pellet, between adjacent circles or holes.

The proposed design in FIG. 6 is a unique catalyst pellet design not previously proposed in prior art for naphtha aromatization to maximize external surface area and void fraction without compromising catalyst pellet crush strength or bed pressure drop. This design will achieve the highest catalyst effectiveness factor and lowest pressure drop without compromising crush strength. This shape can be applied to pellets of different sizes. Further optimization of the catalyst pellet can be achieved by adopting an egg-shell platinum loading on the catalyst pellet during dip impregnation step, with more of the platinum disposed on the external surface of the pellet and less in the interior of the pellet.

Two optimum pellet shapes, one widely used in SMR catalysts (FIG. 5A) and one proposed as part of this invention (FIG. 5D) are compared in Table 3 below. The associated Geometric Surface Area, equivalent catalyst particle size and bed void fractions are computed for different sizes of pellets. Bed void fraction cannot be accurately predicted. What is shown below is an estimate. It is clear that the seven-hole configuration of this invention provides higher GSA, smaller equivalent particle diameter and equivalent bed void fraction compared to the state-of-the-art Katalco Quadralobe design.

TABLE 3

Comparison of Multi-holed, multi-grooved catalyst pellet shapes for LNAR

| Pellet Characteristics | Katalco 25-4MQ | Katalco 25-4Q | Katalco 25-4GQ | Katalco 25-4LQ | 7H6GD Invention | 7H6GD Invention | 7H6GD Invention | 7H6GD Invention |
|---|---|---|---|---|---|---|---|---|
| Aspect ratio: H/D Ratio | 1.25 | 1.25 | 1.25 | 1.25 | 1.25 | 1.25 | 1.25 | 1.25 |
| D, Outside Diam, mm | 10.5 | 13 | 16 | 25.4 | 10.5 | 13 | 16 | 25.4 |
| L, Pellet Height, mm | 13 | 17 | 20 | 31.7 | 13 | 17 | 20 | 31.7 |
| No of holes | 4 | 4 | 4 | 4 | 7 | 7 | 7 | 7 |
| Hole diam, mm | 2.7 | 3.5 | 4.4 | 7 | 2.1 | 2.7 | 3.3 | 5.2 |
| No of grooves | 4 | 4 | 4 | 4 | 6 | 6 | 6 | 6 |
| Groove hole diam, mm | 2.7 | 3.5 | 4.4 | 7 | 2.1 | 2.7 | 3.3 | 5.2 |
| Minimum wall thickness/ Pellet diam, % | 13 | 13 | 13 | 13 | 13 | 13 | 13 | 13 |

TABLE 3-continued

Comparison of Multi-holed, multi-grooved catalyst pellet shapes for LNAR

| Pellet Characteristics | Katalco 25-4MQ | Katalco 25-4Q | Katalco 25-4GQ | Katalco 25-4LQ | 7H6GD Invention | 7H6GD Invention | 7H6GD Invention | 7H6GD Invention |
|---|---|---|---|---|---|---|---|---|
| Hole + Groove Surface Area/Total Pellet Area, % | 0.40 | 0.43 | 0.45 | 0.46 | 0.42 | 0.42 | 0.42 | 0.42 |
| $A_b$, Geometric Surface Area/unit reactor volume, m2/m3 | 611 | 500 | 412 | 258 | 678 | 549 | 449 | 283 |
| Equivalent Catalyst pellet Diam (surface area basis) = (6Vc/Sc), mm | 3.70 | 4.24 | 4.97 | 7.85 | 3.22 | 3.97 | 4.85 | 7.64 |
| Dp/Dt, % (pellet diam/tube diam) | 9 | 11 | 14 | 22 | 9 | 11 | 14 | 22 |
| I. Bed Void fraction, % (Estimated) | 62 | 65 | 66 | 66 | 64 | 64 | 64 | 64 |

As can be seen from the above table, for the same pellet size, the 7H6GD configuration provides higher $A_b$, Geometric Surface Area/unit reactor volume, m2/m3 and comparable bed void fraction to the Katalco Quadralobe shape. Also, for the same pellet shape or configuration, different Geometric Surface area/unit reactor volume and bed void fractions are possible. This allows different pellet sizes to be deployed in different tube zones depending on the requirements for that zone. $A_b$, Geometric surface area/unit reactor volume is a reasonable proxy for Catalyst Effectiveness Factor and bed void fraction is a reasonable proxy for bed pressure drop.

Pressure Drop SMR clean tube pressure drop is only 0.1 MPa for the 12-metre long tube whereas the LNAR clean tube pressure drop can be as high as 0.2-0.5 MPa, largely due to the lower LNAR operating pressure compared to SMR. The LNAR tube outlet pressure has been raised to 1 MPa to increase throughput while lowering the axial flow tube pressure drop. Since pressure drop is highly sensitive to bed void fraction, the catalyst pellet has been shaped to permit the highest void fraction without compromising crush strength. This will enable a higher tube pressure drop of 0.3-0.6 MPa, targeting clean tube delta P of 0.2-0.4 MPa.

Cylindrical pellets provide higher void fraction than spheres. Whereas the typical 1/16 and 1/8 in cylindrical extrudate catalysts pack in such a way that bed void fraction is typically around 40% or less, the large 10 mm to 25 mm multi-holed, multi-grooved cylindrical pellets as shown in the FIGS. 5 and 6 pack in such a way that bed void fraction tends to be quite high—in the range of 60-65%. The seven-hole, six-groove design further augments void fraction. This is sometimes required to keep bed pressure drop under <0.6 MPa.

Catalyst Crush strength The LNAR catalyst has adequate crush strength to withstand the thermal stresses inherent to a multi-tubular furnace reactor, in addition to the fluid pressure of 1.4 MPa and catalyst bed weight of 55-60 kg. Of these, the thermal stresses from temperature cycles ranging from room temperature to 1000° C. are often the most debilitating. All of these impose a requirement for good crush strength. A catalyst with crush strength >60 Kgf is usually needed. Catalyst attrition/break up will lead to bed plugging and require a shutdown and catalyst change out.

Crush strength can be improved through a number of ways:
i) Starting with finer catalyst crystallite sizes;
ii) Increasing the binder content, such as Silica or use of an alternate basic binder;
iii) Calcining at higher temperatures and finally,
iv) Shape and size of the catalyst pellet including wall thickness and aspect ratio.

Whereas a majority of radial and axial flow fixed bed reactors utilize 1/16 and 1/8 in extrudates, SMR reactors use large 10 mm to 25 mm cylindrical pellets with multiple holes, domes and grooves. Because of the multiple touch points and bridging structures inherent to these SMR catalyst pellets, they provide order-of-magnitude higher crush strengths compared to 1/16-inch extrudates. To achieve high structural integrity, the pellet's internal wall thicknesses between holes has to be carefully managed. All pellet sizes of the 7H6GD shape of this invention provide a minimum internal wall thickness that is 13% of the pellet diameter. The bridging structures form a multiplicity of intersecting walls that lends mechanical strength. The aspect ratio of the catalyst pellet, namely height/diameter ratio, is another key parameter that should be controlled to prevent breakage along the cylinder. This is generally achieved by keeping the aspect ratio, Height/Diameter ratio, of the catalyst pellet in the range of 1.0-1.5. This 1.0-1.5 aspect ratio also helps to maximize gas flow rate through the tube for a given pressure drop. Another feature common in SMR pellets is a dome shape on the two ends. While the dome shape reduces surface area and is therefore not desirable, a slight convex curvature at the two ends increases the number of contact points between adjacent catalyst pellets, which helps to distribute force and therefore minimizes catalyst loss due to attrition. SMR operation has demonstrated that the multi-holed, multi-grooved pellet type catalyst has sufficient crush strength to handle this. Compared to SMR, a similarly shaped LNAR catalyst will be exposed to much less thermal stress (cycles from room temperature to only 550° C.), much lower feed inlet pressure of 1.7 MPa, lower temperature gradient (50° C.) from feed entry zone to exit zone and lower catalyst bed weight (35 to 60 Kg), all of which make the service much less severe from catalyst attrition point of view.

Catalyst Composition Over the years, both SMR and AROMAX® catalysts have demonstrated stable performance over the 2 to 4-year turnaround cycle without need for intermittent online or offline regeneration. One major difference between the two reforming services is the composition of the catalyst. SMR requires an inexpensive base Ni metal catalyst on a mixed metal oxide support whereas LNAR requires a precious metal catalyst on an expensive zeolite support. Whereas SMR can afford to distribute 21 wt % Ni uniformly on the alumina support, light naphtha aromatization catalyst contains only between 0.5 to 1.5 wt % Platinum on L-zeolite support. Therefore, obtaining high productivity out of the limited Platinum content is generally important. A second precious metal may be used along with Platinum. A varying amount of binder may be used along with the zeolite. It could be a neutral silica or alumina binder or a basic magnesium aluminum hydrate binder. The binder will help with extrusion, improve crush strength and may also contribute to mesoporosity, to reduce diffusion limitations.

Platinum Utilization At the very high temperature, SMR reaction is diffusion limited rather than reaction kinetics limited, particularly given the rather large size of the catalyst pellets. Catalyst effectiveness factor (which represents the balance between reaction kinetics on the one hand and heat and mass diffusion inside the pellet pores on the other hand) are often difficult to measure and there is no conclusive way to estimate it for non-isothermal reactions. Nevertheless, the consensus is that SMR catalyst effectiveness factor is as low as 0.05. This is not a huge concern because the base metal Nickel catalyst is inexpensive. Diffusion limitations are not a major concern in the case of 1/16 inch extrudate Platinum catalyst used in traditional adiabatic radial-flow naphtha reforming services such as Platforming® and AROMAX® since the reactors are heat transfer-limited, not catalyst volume limited. However, heretofore it was not known that in the case of multi-holed, multi-grooved catalyst pellets of the LNAR Furnace reactor, diffusion resistance is a problem. Since zeolites, by definition, have small pore diameters (7 Angstrom for L-zeolite), reactant and product diffusion into and out of the pores can inhibit reaction rates, particularly at high temperatures which occur in the boundary layer near the tube wall and in the middle and bottom zones of the reactor tube. Therefore, catalyst effectiveness factors for light naphtha aromatization on Pt/KL and particularly, Pt/FKL catalyst, can be low (in the range of 50% to 10%). Platinum utilization follows the effectiveness factor. If that is the case, only the external surface of the catalyst pellet and a micron-thin layer beneath it are effective. Therefore, a consideration in catalyst design is maximizing $A_b$, Geometric surface area per unit reactor bed volume without compromising crush strength or bed pressure drop, as shown in Table 3 with the 7H6GD shape. Generally, smaller size pellets are preferred because they enable higher effectiveness factors and better platinum utilization; however, their gas handling capacity for a given bed pressure drop is lower compared to larger diameter pellets. This poses a challenge in the bottom zone of the reactor tube where gas volumetric flow rate may be three times as much as the top zone, necessitating larger diameter pellets. In the bottom zone, bulk fluid temperature approaches tubewall temperature and therefore effectiveness factors tend to be lower. Bed pressure drop tends to be higher in the bottom zone. These considerations may guide us to use larger size pellets in the bottom zone.

Further, there are several simultaneous reactions occurring and not all reaction rates are equally impacted by the interplay of reaction kinetics versus diffusion, resulting in different effectiveness factors for different reactions. Effectiveness factor varies not only by reaction but also as a function of axial and radial position along the flow path. Further, the undesirable (slow) hydrocracking reactions have high effectiveness factors whereas the desirable, medium-fast Hydrodecyclization reactions have low effectiveness factors. This impacts Benzene selectivity over light ends formation, so that catalyst improvements such as Pt/FKL, to favor benzene selectivity over light ends production, ie. Hydrodecyclization over cracking reactions, get traded away in practice.

Cordierite, FeCrAl or Copper monoliths, interspersed with copper wire mesh pads as thermal conductivity enhancers between successive monolith blocks, as disclosed in WO 2020/039374, may be a suitable catalyst substrate for use in the bottom zone of the tubular reactor. The Pt/FKL or Pt/KL catalyst may be disposed on the monolith substrate. This might be a superior alternative to use of multi-holed, multi-grooved, domed pellets. One of the drawbacks of monoliths in general, namely poor radial heat transfer, is not a major handicap in the bottom zone of the tube, because heat fluxes have already declined below 50 KW/m2, well below average heat flux. On the other hand, pressure drop through monoliths may be order of magnitude lower and effectiveness factors, when the Pt on FKL catalyst is disposed on a cordierite substrate, may be order of magnitude higher, compared to multi-holed, multi-grooved, domed pellets. Copper wire mesh pad thermal conductivity enhancers may be inserted between cordierite monolith blocks, as disclosed in WO 2020/039374.

Space Velocity Traditional naphtha reforming as practiced in radial-flow adiabatic reactors are designed to operate at liquid hourly space velocities between 2 to 4 and weight hourly space velocities between 2 and 5. Multi-tubular furnace reactors for light naphtha aromatization usually adhere to the same naphtha reforming LHSV of 2 to 4. The multi-tubular furnace and catalyst configuration articulated here enables higher LHSV, ranging from 5 to 9 and WHSV, ranging from 6 to 12, by carefully overcoming heat and mass transfer limitations. As shown in Tables 1 & 2, the selectivity ratio of Benzene over light ends improves from 13.1 to 20.7 over the same Pt/FKL catalyst as WHSV increases from 2 to 80. This invention takes advantage of the superior radial heat transfer made possible by disposing catalyst inside a fired heater tube by operating at higher space velocity than traditional adiabatic naphtha reforming or prior art on externally heated reactors or isothermal reactors for light naphtha reforming. Whereas, prior art typically requires 500 to 5000 tubes for the multi-tubular furnace reactor, the instant application visualizes the need for only 200 to 500 tubes, as shown in Example 1-6, due to the much higher weight hourly space velocity. As noted earlier, the GHSV of tubular reactor contents at standard temperature and pressure (STP) is greater than 100,000 in this application. At these very high velocities, coke formation is also suppressed since coking is, even more so than hydrocracking, a slow, delayed reaction.

Fresh vs. Regenerated Catalyst US patent 2019/0249091 shares examples with yield adjusted catalyst temperature performance and aromatics selectivity of fresh and regenerated catalyst. The key teaching is that regenerated catalyst has as good or better selectivity to aromatics/Benzene as fresh catalyst; However, the activity of regenerated catalyst is about 40° F. lower. Given the above examples, US patent 2019/0249091 teaches the use of regenerated catalyst in the early stages of aromatization scheme to convert the relatively easily convertible hydrocarbons and use of fresh catalyst in the later stages for the more refractory hydrocarbons. In a similar fashion, US patent 2019/0203128 A1 teaches loading regenerated catalyst in the pre-reformer adiabatic reactors and at the top of the isothermal reactor and loading fresh catalyst in the bottom of the isothermal reactor.

Based on the tubular temperature shown in FIG. 3 for a top-fired, top-fed multi-tubular reactor, this invention teaches the opposite arrangement:
1) Load fresh catalyst at the top of the tube where temperatures are lower and therefore, effectiveness factors tend to be higher, all other factors staying the same.
2) Load the regenerated Pt/FKL catalyst in the bottom of the tube where bulk fluid temperatures are generally higher and therefore, effectiveness factor would tend to be lower.
3) If possible, load the reactor utilizing concentric socks during catalyst loading so that the regenerated catalyst is loaded closer to the wall, where temperatures are high and fresh catalyst is loaded in the center of the tube, where temperatures are lower.

Adiabatic pre-reforming: Typical light naphtha aromatization feed contains C6 molecules (N-hexane, branched hexanes, methyl cyclopentane, cyclohexane and Benzene) and C7 molecules (N-heptane, branched heptanes, methyl cyclohexane, toluene, among others). As noted earlier, four distinct reaction types—DeHydrocyclization, Dehydrogenation, Isomerization and Hydrogenolysis/cracking reactions occur in light and medium naphtha reforming that occur over Pt on KL-zeolite catalysts.

It is widely known in the literature that Pt on KL-zeolite catalyst is extremely sensitive to sulfur poisoning. Back in the 1990s, the AROMAX® process developed a four-step sulfur removal process as part of the feed preparation system, including traditional Naphtha Hydrodesulfurization as a first step, followed by a first Sulfur Adsorber bed, followed by Sulfur Converting reactor utilizing Platinum on chlorided alumina reforming catalyst, followed by a second Sulfur Adsorber bed to capture any H2S released by the Sulfur Converting reactor. This scheme is able to meet ppb sulfur removal specifications. Commercial units with this sulfur removal scheme have been operating trouble-free for several decades now but there is always an opportunity to simplify the process.

The Sulfur Converting reactor is a traditional adiabatic naphtha reforming reactor, albeit operating at a lower temperature. Since we have a subsequent furnace reactor to carry out bulk of the naphtha reforming, ideally we want to limit this adiabatic naphtha reforming step to sulfur conversion and not carry out substantial Hydrogenation/ DeHydrogenation reactions such as converting benzene to cyclohexane or cyclohexane to benzene or cracking light ends. US Patent 2019/0201861 A1 (McGahee and Hasenberg) proposes that the Pt on chlorided alumina catalyst in the Sulfur Converting Absorber can be replaced by a Pt on L-zeolite catalyst. Even though the L-zeolite catalyst is more expensive than the Pt on chlorided alumina catalyst, by utilizing Pt on L-zeolite catalyst, the need for a segregated chloriding step for a small portion of the overall AROMAX® process is eliminated. Since this pre-reformer is a adiabatic reactor and we do not wish to saturate Benzene present in the feed, which would have to be subsequently reversed in the furnace reactor, a regenerated Pt on L-zeolite pellet shaped catalyst or Pt on L-zeolite disposed on a monolith substrate, can be utilized in the Sulfur Converting Absorber.

SUMMARY EXAMPLE

Examples of four-inch and five-inch Light Naphtha Aromatization tubular reactors containing Pt/FKL zeolite catalyst are shown in Examples 1-4 at nominal SOR and EOR conditions.

Examples 1-4

Seven-holed, six-grooved and domed (7H6GD) 16 mm catalyst pellet containing 1 wt % Pt on Fl-treated KL-zeolite weighing 35.5 kg was loaded in 4-inch tubes and 55.45 kg was loaded in 5-inch tubes of a multi-tubular reactor furnace and n-Hexane feed was aromatized as per the simulation results shown in Table 4 below. All results are reported is on a per heater tube basis.

TABLE 4

| | Examples: | | | | | | | |
|---|---|---|---|---|---|---|---|---|
| | 1 | | 2 | | 3 | | 4 | |
| Condition: SOR/EOR | SOR | EOR | SOR | EOR | SOR | EOR | SOR | EOR |
| Inner Diameter of Tube, inches | 4 | | | | 5 | | | |
| Hexanes Feed rate, kg/Hr | 430.5 | | | | 530.3 | | | |
| Hexanes Feed rate, BPD | 99 | | | | 121 | | | |
| Catalyst weight, kg | 35.5 | | | | 55.5 | | | |
| LHSV, hr −1 | 6.8 | | | | 5.3 | | | |
| WHSV, hr−1 | 12.3 | | | | 9.7 | | | |
| H2/Hydrocarbon ratio | 2:1 | | 1:1 | | 2:1 | | 1:1 | |
| Inner tubewall temperature, ° F. | 940 F. | 980 F. | 940 | 980 | 970 F. | 1010 F. | 970 F. | 1010 F. |
| Effluent outlet temperature, ° F. | 917 | 966 | 917 | 968 | 935 | 991 | 934 | 993 |

TABLE 4-continued

| | Examples: | | | | | | | |
|---|---|---|---|---|---|---|---|---|
| | 1 | | 2 | | 3 | | 4 | |
| Condition: SOR/EOR | SOR | EOR | SOR | EOR | SOR | EOR | SOR | EOR |
| Radial temp gradient @ L = 2 m, ° F. | 70 | 83 | 83 | 97 | 96 | 111 | 110 | 127 |
| Radial temp gradient @ L = 12 m, ° F. | 17 | 8 | 18 | 7 | 20 | 4 | 20 | 2 |
| Inlet pressure, psig | 203 | 211 | 197 | 200 | 190 | 193 | 184 | 185 |
| Reactor Pressure drop, psi | 45 | 53 | 39 | 43 | 32 | 35 | 25 | 27 |
| Peak Heat Flux, KW/m2 | 103 | 132 | 110 | 136 | 100 | 121 | 105 | 124 |
| Oil Absorbed Heater Duty, KW | 252 | 275 | 265 | 285 | 330 | 358 | 346 | 367 |
| H2 prodn per tube, MMSCFD | 0.234 | 0.255 | 0.257 | 0.267 | 0.319 | 0.329 | 0.334 | 0.341 |
| Conversion, % | 85 | 94 | 88 | 96 | 90 | 97 | 91 | 98 |
| Benzene Selectivity, % | 84 | 81 | 86 | 83 | 85 | 82 | 87 | 84 |
| No of Heater tubes required for 100 MMSCFD Hydrogen | 412 | 392 | 389 | 374 | 313 | 304 | 300 | 293 |
| Feed inlet temperature, ° F. | | | | 845 | | | | |
| Length of Tube, m | | | | 12 | | | | |
| Bed Void Fraction | | | | 0.64 | | | | |
| Catalyst Pellet size, mm | | | | 16 | | | | |
| Pellet Aspect Ratio(H/D) | | | | 1.25 | | | | |
| Pellet Equivalent Diam, mm | | | | 4.8505 | | | | |

Since reaction rates, concentrations and heat effects vary both axially and radially, the foregoing examples were simulated by dividing the tubular reactor into 31 axial increments with the heat balance on each reactor segment solved by trial and error. An analytical solution to the differential equation describing a flowing fluid inside a packed column with heat generated/consumed and a constant inside wall temperature, is found in terms of Fourier series of Bessel functions, as reported by Koichi Kato and Satoshi Fukase, Sekiyu Gakkaishi, Vol. 37, No. 1, 1994, pgs. 77-83. This technique is used to compute the radial temperature distribution at each axial increment. Although tube-wall temperature can vary in a top-fired furnace design, a flat temperature profile was assumed. The tubewall, boundary layer, tube center and average flowing bulk fluid temperature computed per the above procedure is displayed in FIG. 3 for a 4-inch tube loaded with 16 mm Pt/FKL catalyst. Pt/KL catalyst reaction kinetics performance data was taken from Nagamatsu et al, Sekiyu Gakkaishi, 44, (6), pgs. 351-359, 2001. Pt/FKL reaction rate performance, relative to Pt/KL catalyst, was based on relative performance estimate provided by Sugimoto et al, Applied Catalysis A: General, 106 (1993) pgs. 9-25.

While it is possible to use different size and different activity catalysts in different zones of the fired heater tube, this simulation is made with the same activity and size pellet throughout the tube. Although a 4 inch tube can have higher pressure drop, it also runs substantially cooler than the 5 inch tube and is less prone to fouling, so that the H2:HC ratio can be dropped from 2:1 to 1:1, lowering bed pressure drop, improving n-Hexanes conversion as well as Benzene selectivity. The simulations point out how compact the furnace reactor can be. A furnace rector fitted with 389 four-inch diameter tubes×12 meters long, running 1:1 H2:HC ratio takes 38,500 BPD Hexanes feed and yields 100 MMSCFD Hydrogen. This is very much comparable to the performance of a modern top-fired SMR. Compare this to other externally fired Light Naphtha Aromatization patents requiring from 12000 (Imura et al) to 5000 tubes (McGahee & Hasenberg).

Examples 5-6

Seven-holed, six-grooved and domed (7H6GD) 16 mm catalyst pellet containing 1 wt % Pt on KL-zeolite weighing 35.5 kg for Example 5 and a graded bed containing Fresh Pt/FKL in the top ⅓ and Regenerated Pt/FKL catalyst in the bottom ⅔ of the bed weighing 35.5 kg for Example 6, was loaded in 4-inch tubes of a multi-tubular reactor furnace and n-Hexane feed was aromatized as per the simulation results shown in Table 5 below. All results are reported is on a per heater tube basis.

TABLE 5

| Example: | 5 | | 6 | |
|---|---|---|---|---|
| Condition: SOR/EOR | SOR | EOR | SOR | EOR |
| Catalyst Type | Pt/KL | | Regen Pt/FKL | |
| Tube Diameter, inches | 4 | | 4 | |
| Hexanes Feed rate, kg/Hr | 430.5 | | 430.5 | |
| Hexanes Feed rate, BPD | 99 | | 99 | |
| Catalyst weight, kg | 35.5 | | 35.5 | |
| LHSV, hr-1 | 6.8 | | 6.8 | |
| WHSV, hr-1 | 12.3 | | 12.3 | |
| H2/Hydrocarbon ratio | 1:1 | | 1:1 | |
| Inner tubewall temperature, ° F. | 970 F | 1020 F | 970 | 1020 |
| Effluent outlet temperature, ° F. | 952 | 1010 | 952 | 1013 |
| Radial temp gradient @ L = 2 m, ° F. | 57 | 72 | 94 | 111 |

TABLE 5-continued

| Example: | 5 | | 6 | |
|---|---|---|---|---|
| Condition: SOR/EOR | SOR | EOR | SOR | EOR |
| Catalyst Type | Pt/KL | | Regen Pt/FKL | |
| Radial temp gradient @ L = 12 m, ° F. | 15 | 17 | 14 | 3 |
| Inlet pressure, psig | 193 | 197 | 200 | 204 |
| Reactor Pressure drop, psi | 35 | 39 | 41 | 45 |
| Peak Heat Flux, KW/m2 | 90 | 125 | 129 | 165 |
| Oil Absorbed Heater Duty, KW | 182 | 207 | 264 | 285 |
| H2 prodn per tube, MMSCFD | 0.176 | 0.255 | 0.248 | 0.256 |
| Conversion, % | 81 | 94 | 90 | 97 |
| Benzene Selectivity, % | 77 | 81 | 85 | 81 |
| No of Heater tubes required for 100 MMSCFD Hydrogen | 569 | 392 | 403 | 391 |
| Feed inlet temperature, ° F. | 845 | | 845 | |
| Length of Tube, m | 12 | | 12 | |
| Bed Void Fraction | 0.64 | | 0.64 | |
| Catalyst Pellet size, mm | 16 | | 16 | |
| Pellet Aspect Ratio (H/D) | 1.25 | | 1.25 | |
| Pellet Equivalent Diam, mm | 4.8505 | | 4.8505 | |

Since reaction rates, concentrations and heat effects vary both axially and radially, the foregoing examples were simulated by dividing the tubular reactor into 31 axial increments with the heat balance on each reactor segment solved by trial and error. An analytical solution to the differential equation describing a flowing fluid inside a packed column with heat generated/consumed and a constant inside wall temperature, is found in terms of Fourier series of Bessel functions, as reported by Koichi Kato and Satoshi Fukase, Sekiyu Gakkaishi, Vol. 37, No. 1, 1994, pgs. 77-83. This technique is used to map the radial temperature profile at each axial increment. Although tubewall temperature can vary in a top-fired furnace design, a flat temperature profile was assumed. Pt/KL catalyst reaction kinetics performance data was taken from Nagamatsu et al, Sekiyu Gakkaishi, 44, (6), pgs. 351-359, 2001. Pt/FKL reaction rate performance relative to Pt/KI catalyst was based on relative performance estimate provided by Sugimoto et al, Applied Catalysis A: General, 106 (1993) pgs. 9-25. Regenerated Pt/KL performance data was reported in US patent 2019/0249091 A1.

Pt/FKL is equivalent to AROMAX® II catalyst and represents an improvement over AROMAX® I catalyst. As shown above, Pt/KL requires higher temperature operation to achieve the same n-Hexanes conversion as Pt/FKL catalyst with a loss in Benzene selectivity compared to Pt/FKL. Since AROMAX® II catalyst is expensive, Example 2 and 6 compare the performance of Fresh AROMAX® II catalyst (Pt/FKL) versus a graded bed, with top ⅓ loaded with Fresh AROMAX® II catalyst and bottom ⅔ loaded with Regenerated AROMAX® II catalyst, in 4 inch tube with 1:1 H2:HC feed inlet mole ratio. As the comparison shows, while use of Regenerated catalyst requires higher tubewall temperatures, the conversion and Benzene selectivity performance of regenerated catalyst, when loaded in the bottom ⅔ of the tube, is pretty good, comparable to all fresh catalyst.

SPECIFIC EMBODIMENTS

1. A process for forming aromatic hydrocarbons from a hydrocarbonaceous feedstream, comprising
contacting the feedstream with a catalyst shaped in the form of a cylindrical pellet, with multiple holes through it and grooves on the periphery, and with the two circular top and bottom ends domed, contained within the heater tubes of a reactor furnace, wherein the non-acidic catalyst is effective to form aromatic hydrocarbons by catalytic reforming of the feedstream hydrocarbons, and
the feedstream comprises a naphtha fraction having a predominately C6 to C8 content; and providing heat to the furnace heater tubes for the catalytic reforming of the feedstream hydrocarbons to form aromatic hydrocarbons wherein, in some alternative embodiments, the Pt/FKL or Pt/KL catalyst may be disposed on a monolith substrate in the bottom zone of one or more tubes and wherein such monolith may, in some cases, facilitate lower pressure drop and higher platinum utilization.

2. The process of embodiment 1, wherein the catalyst is a monofunctional catalyst comprising a Group VIII metal.

3. The process of embodiment 2, wherein the Group VIII metal comprises platinum.

4. The process of any one of embodiments 1-3, wherein the catalyst comprises L-zeolite or a combination of L-zeolite with another catalyst 5. The process of any one of embodiments 1-4, wherein the catalyst comprises a mesoporous neutral silica or alumina or a basic magnesium alumina hydrate binder in addition to the L-zeolite.

6. The process of embodiment 3, wherein the platinum is impregnated on L-zeolite or a combination of L-zeolite with another catalyst.

7. The process of any one of embodiments 1-6, wherein the L-zeolite is treated by a process comprising ion exchange with an alkaline earth metal.

8. The process of embodiment 7, wherein the alkaline earth metal comprises barium.

9. The process of any one of embodiments 1-8, wherein the catalyst is treated with a halogen compound, such as Flourine.

10. The process of embodiment 9, wherein the halogen compound comprises fluorine, chlorine, or a mixture thereof.

11. The process of any one of embodiments 1-10, wherein the catalyst comprises a Pt/FKL or Pt/KL catalyst.

12. The process of embodiment 11, wherein the Pt/FKL or Pt/KL catalyst is shaped in terms of a cylindrical pellet with multiple holes passing through the cylinder and multiple semi-circular grooves or holes on the periphery of the cylinder, with the top and bottom ends of the cylinder shaped as domes.

13. The catalyst of embodiment 12, wherein there are seven equal-sized holes passing through the cylindrical Pt/FKL or Pt/KL catalyst pellet, one in the center and six surrounding it.

14. The catalyst of embodiment 12, wherein there are six grooves or flutes cut on the periphery of the cylindrical Pt/FKL or Pt/KL catalyst pellet.

15. The catalyst of embodiment 12, wherein the holes and the grooves are of the same diameter.

16. The catalyst of embodiment 12, wherein at no point are the walls surrounding the cylindrical holes less than 11% or 12% or 13% of the cylindrical pellet diameter.

17. The catalyst of embodiment 12, wherein the aspect ratio (Height to diameter) of the cylindrical pellet ranges from 0.5 to 1.5, preferably 1.0 to 1.25.

18. The catalyst of embodiment 12, wherein the elliptical dome height is no more than 12.5 percent of the cylinder height.

19. The catalyst of embodiment 12, wherein the platinum loading on the Pt/FKL catalyst may be varied per an egg shell scheme, with deeper platinum penetration catalyst loaded in the entry zone, medium penetration catalyst loaded in the middle zone, and shallow penetration in the exit zone.

20. The process of embodiment 12, wherein the halogen treatment level of the Pt/FKL catalyst may be varied along the length of the reactor tube.

21. The process of embodiment 12 through 19 wherein the diameter of the cylindrical pellet as well as the number of holes and grooves and the ratio of hole area to total cylinder area of the Pt/FKL cylindrical pellet as well as the aspect ratio may be varied along the length of the reactor tube.

22. The process of any one of embodiments 1-11, wherein the Pt/FKL or Pt/KL catalyst is disposed on a monolith, interspersed with thermal conductivity enhancers between successive monolith blocks, with the pellets and thermal conductivity enhancer assembly is optionally wrapped in a metallic sheath lining the tube wall.

23. The process of any one of embodiments 1-14, wherein the catalyst deactivation rate is less than about 0.04° F./hr, or less than about 0.02° F./hr, or less than about 0.01° F./hr, or less than about 0.005° F./hr.

23. The process of any of embodiments 1-16 wherein the hydrocarbonaceous tube outlet pressure is as high as 150 prig.

25. The process of any of embodiments 1-17 wherein the peak heat flux across the tube wall of the top fired heater can be as high as 150 KW/m2.

26. The process of any of embodiments 1-18 wherein the average heat flux over the length of the tube can be as high as 80 KW/m2.

27. The process of any of the embodiments 1-17 wherein the oil absorbed heat duty can be as high as 285 KW for a 12 meter long×four inch tube and as high as 370 KW for a 12 meter long×five inch tube.

28. The process of embodiment 22, wherein the monolith is selected from Cordierite, FeCrAl or Copper monoliths.

29. The process of embodiment 22, wherein the thermal conductivity enhancer comprises metal foam, or wire mesh or metal fiber pad, wherein the metal is selected from iron, chromium, aluminum, nickel, or copper, or an alloy or a combination thereof, preferably wherein the metal comprises copper.

30. The process of embodiments 22 and 28-29, wherein the metal sheath lining the reactor wall and surrounding the monolith and thermal conductivity enhancer is selected from among iron, chromium, aluminum, nickel, or copper, or an alloy or a combination thereof, preferably wherein the metal comprises copper.

31. The process of any one of embodiments 1-30, wherein the heater tubes comprise an entry zone, a middle zone and an exit zone, the entry zone being from about 10-30% of the linear length of the tubes, the middle zone being about 40-80% of the linear length of the tubes, and the exit zone being from about 10-30% of the linear length of the tubes.

32. The process of embodiment 22, wherein (a) the entry zone radial temperature gradient from the tube wall to the tube center is less than about 200° C., preferably less than about 150° C., or preferably less than about 100° C.; or (b) the middle zone radial temperature gradient from the tube wall to the tube center is less than about 150° C., preferably less than about 125° C., or preferably less than about 100° C.; or (c) the exit zone radial temperature gradient from the tube wall to the tube center is less than about 60° C., preferably less than about 40° C., or preferably less than about 20° C.; or a combination of (a), (b), or (c) thereof.

33. The process of any one of above embodiments, wherein the overall furnace process-side pressure drop through the heater tubes is less than about 100 psig, or 60 psig, or 50 psig or 40 psig.

34. The process of embodiment 11, wherein the catalyst is graded by pellet size, with smaller diameter cylindrical catalyst pellets in the entry zone, medium size cylindrical catalyst pellets in the middle zone, and larger size cylindrical pellets in the exit zone.

35. The process of embodiment 11, wherein in lieu of cylindrical pellets, the Pt/FKL or Pt/KL catalyst in the exit zone is disposed on a monolith, fitted to the diameter of the furnace tube with use of thermal conductivity enhancers to enhance radial heat transfer in between successive monolith blocks, the entire assembly optionally wrapped in a metal sheath lining the wall.

36. The process of embodiment 11, wherein at least a portion of the catalyst employed in the bottom ⅔ or ⅓ is regenerated Pt/FKL catalyst.

37. The process of any one of embodiments 1-26, wherein the furnace is top-fired, side-fired, or terrace-fired, or an arbor or inverted-arbor design.

38. The process of embodiment 27, wherein the furnace is top-fired with alternate rows of vertical heater tubes and top-mounted burners.

39. The process of embodiment 28, wherein the heater tube feedstream inlet is located at the top of the heater tubes.

40. The process of any one of embodiments 1-39, wherein the heater tubes have a diameter between about 3 in. and 6 in. (7.6 cm to 15.2 cm).

41. The process of any one of embodiments 1-40, wherein the heater tubes have a length of 6 to 12 meters.

42. The process of any one of embodiments 1-40, wherein the heater tubes are made from a corrosion resistant material, preferably stainless steel, and are optionally coated or treated with a corrosion or carburization inhibitor, preferably comprising an interior layer of tin.

43. The process of any one of embodiments 1-42, wherein the process fluid inside the heater tube do not exceed 550° C. at any point so that low grade stainless steel metallurgy may be sufficient for the tubes and the carburization inhibitor, such as a tin coating on the interior of the heater tubes, is not required.

44. The process of any one of embodiments 1-31, wherein the feedstream is pre-heated prior to entering the heater tubes.

45. The process of any one of embodiments 1-32, wherein the feedstream C6 to C8 content is at least about 60 vol %, or 70 vol. %, or 80 vol. %, or 90 vol. %, or 95 vol. %, or 98 vol. %, or 99 vol. %.

46. The process of any one of embodiments 1-33, wherein the feedstream C6 to C7 content is at least about 60 vol %, or 70 vol. %, or 80 vol. %, or 90 vol. %, or 95 vol. %, or 98 vol. %, or 99 vol. %.

47. The process of any one of embodiments 1-34, wherein the feedstream comprises less than about 100 ppb sulfur, or 50 ppb or 30 ppb, or 20 ppb, or 10 ppb, or 5 ppb, or 2 ppb, or 1 ppb.

48. The process of any one of embodiments 1-35, wherein the feedstream comprises less than about 100 ppm water, or 50 ppm, or 30 ppm, or 20 ppm, or 10 ppm, or 5 ppm, or 2 ppm, or 1 ppm.

49. The process of any one of embodiments 1-36, wherein feedstream flowrate through the heater tubes is conducted at an WHSV between about 1 to 12 hr−1, or about 6 to 12 hr−1, or about 8 to 12 hr−1.

50. The process of any one of embodiments 1-36, wherein feedstream flowrate through the heater tubes is conducted at an WHSV between about 9 to 12 hr−1.

51. The process of any one of embodiments 1-38, wherein process is operated at an H2 to feedstream hydrocarbon mole ratio (H2:HC) of between about 0.5 to 3, or about 0.5 to 2.5, or about 1.0 to 2.0.

52. A catalytic reforming system for forming aromatic hydrocarbons from a hydrocarbonaceous feedstream, comprising
a reforming furnace reactor containing heater tubes with a catalyst contained within the heater tubes of the furnace, wherein
the catalyst is disposed on a substrate contained within the heater tubes and the catalyst comprises a non-acidic catalyst effective to form aromatic hydrocarbons by catalytic reforming of feedstream hydrocarbons, and
a heat source to provide heat to the furnace heater tubes for the catalytic reforming of the feedstream hydrocarbons to form aromatic hydrocarbons.

53. The system of embodiment 40, wherein the catalyst is a non-acidic, monofunctional catalyst comprising a Group VIII metal.

54. The system of embodiment 41, wherein the Group VIII metal comprises platinum.

55. The system of any one of embodiments 40-42, wherein the catalyst comprises L-zeolite or a combination of L-zeolite with another catalyst.

56. The system of embodiment 43, wherein the platinum is impregnated on L-zeolite or a combination of L-zeolite with another catalyst.

57. The system of any one of embodiments 40-44, wherein the L-Zeolite is treated by a process comprising ion exchange with an alkaline earth metal.

58. The system of embodiment 45, wherein the alkaline earth metal comprises barium.

59. The system of any one of embodiments 40-46, wherein the catalyst is treated with a halogen compound.

60. The system of embodiment 47, wherein the halogen compound comprises fluorine, chlorine, or a mixture thereof.

61. The system of any one of embodiments 40-48, wherein the catalyst comprises a Pt/FKL or Pt/KI catalyst.

62. The system of embodiment 49, wherein the Pt/FKL or Pt/KL catalyst is shaped in terms of a cylindrical pellet with multiple holes passing through the cylinder and multiple semi-circular grooves or holes cut on the periphery of the cylinder, with the top and bottom ends of the cylinder shaped as domes.

63. The system of any one of embodiments 40-50, wherein the catalyst deactivation rate is less than about 0.04° F./hr, or less than about 0.02° F./hr, or less than about 0.01° F./hr, or less than about 0.005° F./hr.

64. The system of any one of embodiments 40-51, wherein the catalyst is in the form of cylindrical pellets, or disposed on a monolith substrate with thermal conductivity enhancers inserted periodically between monolith blocks, the entire assembly optionally wrapped in a metallic sheath.

69. The system of any one of embodiments 54-55, wherein the tube wall temperature is controlled to operate at 500° C. during SOR and rise to 550° C. towards EOR.

70. The system of any one of embodiments 54-55, wherein the reactor tube outlet pressure is between 50 psig and 200 psig, preferably 100 psig and 150 psig.

71. The system of any one of embodiments 54-55, wherein the pressure drop through the heater tubes is less than about 100 psig, or 60 psig or 50 psig or 40 psig.

72. The system of any one of embodiments 40-56, wherein the specifications for the heater tube and catalyst contained therein provide operating conditions of a radial temperature gradient from the tube wall to the tube center of less than about 200° C., preferably less than about 150° C., or preferably less than about 100° C.

73. The system of any one of embodiments 40-57, wherein the heater tubes comprise an entry zone, a middle zone and an exit zone, the entry zone being from about 10-30% of the linear length of the tubes, the middle zone being about 40-80% of the linear length of the tubes, and the exit zone being from about 10-30% of the linear length of the tubes.

74. The system of embodiment 58, wherein the specifications for the heater tube and substrate contained therein provide operating conditions of: (a) an entry zone radial temperature gradient from the tube wall to the tube center of less than about 200° C., preferably less than about 150° C., or preferably less than about 100° C.; or (b) a middle zone radial temperature gradient from the tube wall to the tube center of less than 150° C., preferably less than about 100° C., or preferably less than about 50° C.; or (c) an exit zone radial temperature gradient from the tube wall to the tube center of less than about 60° C., preferably less than about 40° C., or preferably less than about 20° C.; or a combination of (a), (b), or (c) thereof.

75. The system of embodiment 60, wherein the entry zone comprises Pt/FKL or Pt/KL zeolite catalyst shaped as a 11-16 mm diameter cylindrical pellet, with four-seven holes through it and likewise four-seven grooves cut on the outside periphery.

76. The system of embodiment 60, wherein the exit zone Pt/FKL or Pt/KL zeolite catalyst shaped as a 16-25 mm diameter cylindrical pellet, with four-seven holes through it and likewise four-seven grooves cut on the outside periphery.

77. The system of any one of embodiments 40-62, wherein the furnace is top-fired, side-fired, or terrace-fired, or an arbor or inverted-arbor design.

78. The system of embodiment 63, wherein the furnace is top-fired with alternate rows of vertical heater tubes and top-mounted burners.

79. The system of embodiment 64, wherein the heater tube feedstream inlet is located at the top of the heater tubes.

80. The system of any one of embodiments 40-65, wherein the heater tubes have a diameter between about 3 in. and 6 in.

81. The system of any one of embodiments 40-66, wherein the heater tubes are made from a corrosion resistant material, preferably stainless steel, and are optionally coated or treated with a corrosion or carburization inhibitor, preferably comprising an interior layer of tin.

82. The system of any one of embodiments 40-67, further including an optional pre-heater or convection section for pre-heating the feedstream prior to entering the heater tubes utilizing the exhaust heat from the flue gas exiting the fireside of the furnace.

83. The system of any one of embodiments 40-68, further including an optional second and parallel heater bay, with the option of both bays feeding a common convection section in the middle or capable of being totally isolated from each other at the product outlet.

84. The system of any one of embodiments 40-69, wherein one of the heater bays may be periodically shut down for catalyst regeneration while the other heater bay continues to operate in a naphtha aromatization mode.

85. The system of any one of embodiments 40-72, wherein heater tubes are sized for a feedstream flowrate through the heater tubes at a WHSV between about 1 to 12 hr−1, or about 6 to 12 hr−1, or about 8 to 12 hr−1.

87. The system of any of the preceding embodiments wherein the naphtha reforming catalyst deployed in the adiabatic pre-reformer or Sulfur Converter during feed preparation is regenerated Pt on L-zeolite catalyst disposed on multi-holed, multi-grooved, domed pellets.

88. The system of any of the preceding embodiments 1-85 wherein the naphtha reforming catalyst deployed in the adiabatic pre-reformer or Sulfur Converter during feed preparation is Pt on L-zeolite catalyst disposed on monolith substrate.

89. A process for converting an SMR plant to an LNAR plant comprising: substituting SMR reactants and catalysts for LNAR reactants and catalyst; reducing the operating pressure, temperature, and/or flow rate of the feedstream to those suitable for LNAR; and operating the plant as an LNAR plant. (See Table 6 below)

TABLE 6

|  | SMR | LNAR |
| --- | --- | --- |
| Typical Plant Production scale, MMSCFD H2 | 100 (Methane Feed) | 100 (35,000 bpd Lt. naphtha) |
| Number of 4-in × 50 ft long tubes required | 280 | 389 |
| Tube inside Diameter, m | 0.1016 (4 inch) | 0.1016 (4 inch) |
| Tube Length, m | 12 | 12 |
| Fluid Phase condition | All vapor | All vapor |
| Feed | Methane: 5.17 kg mol/Hr | N-Hexane: 5.0 Kgmol/Hr |
| Co Feed mole ratio | Steam/Methane: 3.35:1 | Hydrogen/N-Hexane: 1:1 |
| Fluid Pressure, MPa (Inlet/Outlet) | 2.57/2.33 | 1.38/1.035 |
| Tube Fluid Temperature, K (Inlet/Outlet) | 793/1106 | 725/792 |
| Tube wall Temperature, K (Inlet/Outlet) | 1000 | 778 |
| Gas Density, Kg/m3 | 6.9/3.5 | 8.0/2.8 |
| Superficial Velocity, m/s (Tube Inlet/Outlet) | 2.1/4.2 | 1.8/5.4 |
| GHSV, Hr-1 (Inlet & Outlet) |  | 55690/112932 |
| WHSV, Hr-1 |  | 12.3 |
| Max Tube metal temperature, K | 1000/1148 | 850 |
| Tube metallurgy | Hi Cr-Hi Ni Specialty Stainless steel | 310 S Stainless steel |
| Peak heat flux, KW/m2 | 115 | 110 |
| Overall Heat Transfer Coefficient, W/m2.K | 1000 | 1600 |
| Overall Heat Duty per tube, MMBtu/hr | 1.33 | 0.90 |
| Tube Creep | Significant requiring complex pigtails | Low with potential to simplify pigtails |
| Tube Pressure drop, psi | 20 | 50 |
| Reynolds Number (particle) | 5510/3926 | 8000/9500 |
| Type of catalyst pellet | Ni | Pt on L-Zeolite |
| Effectiveness Factor | 0.05 | ~0.2 (bottom zone) |
| Percent Conversion | Reaches equilibrium | 88% N-Hexane Conversion |

88. A process for converting an SMR plant to an LNAR plant comprising: repurposing the SMR hot and cold shift and methanation reactors to a naphtha HDS unit and sulfur absorber/converter; and/or converting a propylene carbonate physical solvent or CATACARB chemical solvent used in SMR to remove bulk carbon dioxide from syngas to a benzene extraction unit for LNAR by repurposing the SMR plant's aromatics extraction and regeneration distillation columns, flash drums, reboilers, condensers, and/or solvent management facilities (See FIGS. 7A and 7B)

I claim:

1. A process for forming aromatic hydrocarbons from a hydrocarbonaceous feed stream, comprising:
    contacting a feed stream comprising a naphtha fraction having a $C_6$ to $C_8$ content with a catalyst pellet composition effective to form aromatic hydrocarbons by catalytic reforming of the feed stream hydrocarbons; and
    providing heat for the catalytic reforming of the feed stream hydrocarbons to form aromatic hydrocarbons;
    wherein a catalyst bed composition for the catalytic reforming comprises a plurality of cylindrical pellets, each pellet comprising a Group VIII metal on L-zeolite wherein the plurality of cylindrical pellets is characterized by:
    (a) a plurality of holes passing through the length of the cylindrical pellets,
    (b) a dome-shaped top and bottom, and
    (c) a plurality of semi-circular grooves along the length of the exterior of the cylinder.

2. The process of claim 1, wherein the catalyst bed composition is contained within heater tubes of a reactor furnace.

3. The process of claim 2, wherein an inner tubewall temperature is controlled to cause a flowing bulk fluid temperature to remain under about 550° C. at the tube outlet.

4. The process of claim 2, wherein a tube outlet pressure is from about 100 psig to about 150 psig.

5. The process of claim 2, wherein a H2:HC feed mole ratio is about from 1:1 to about 2:1.

6. The process of claim 2, wherein a WHSV is in the range of about 6 to about 15.

7. The process of claim 2, wherein a peak heat flux across an inside tubewall is from about 100 KW/m$^2$ to about 140 KW/m$^2$ and wherein an average heat flux across a length of a tube is in the range of from about 50 to about 85 KW/m$^2$.

8. The process of claim 2, wherein the catalyst bed composition is graded by pellet size, with smaller diameter cylindrical catalyst pellets in an entry zone, medium size cylindrical catalyst pellets in a middle zone, and larger size cylindrical pellets in an exit zone and wherein the pellet size ranges from about 10 mm to about 25 mm in diameter.

9. The process of claim 2, wherein the reactor furnace is a top-fired design and wherein a heater tube feedstream inlet is also located at the top of the heater tubes.

10. The process of claim 2, wherein an exit zone employs a Pt/KL catalyst disposed on a monolith substrate, with thermal conductivity enhancers interspersed between successive monolith segments, and optionally, a metal sheath at least partially enveloping the monolith and thermal conductivity enhancer assembly.

11. A catalyst bed composition comprising a plurality of cylindrical pellets, each pellet comprising a Group VIII metal on L-zeolite wherein the plurality of cylindrical pellets is characterized by:
    (a) a plurality of holes passing through the length of the cylindrical pellets,
    (b) a dome-shaped top and bottom, and
    (c) a plurality of semi-circular grooves along the length of the exterior of the cylinder.

12. The catalyst pellet composition of claim 11, wherein the Group VIII metal is platinum and wherein the platinum is supported on FKL or KL zeolite.

13. The catalyst pellet composition of claim 11, wherein there are seven holes passing through the cylindrical catalyst pellet wherein one hole is substantially in the center.

14. The catalyst pellet composition of claim 11, wherein there are six semi-circular grooves along the length of the exterior of the cylindrical catalyst pellet.

15. The catalyst pellet composition of claim 11, wherein the plurality of holes are cylindrical and wherein the plurality of holes and the plurality of semi-circular grooves have substantially the same diameter.

16. The catalyst pellet composition of claim 11, wherein a minimum wall thickness surrounding the plurality of holes is greater than 11 percent of the diameter of the cylindrical catalyst pellet.

17. The catalyst pellet composition of claim 11, wherein an average aspect ratio (length over diameter) of the cylindrical pellets in the composition is from about 0.5 to 1.5 and wherein a pellet diameter is from about 10 to about 25 mm.

18. The catalyst pellet composition of claim 11, wherein each of the dome height of the dome-shaped top and the dome-shaped bottom is 12.5 percent or less of the cylinder height of the catalyst pellet irrespective of the dome-shaped top and bottom on the pellet.

19. The catalyst pellet composition of claim 11, wherein the catalyst pellet composition further comprises mesoporous neutral silica or alumina or basic magnesium aluminum hydrate.

20. A catalyst bed composition comprising:
 a plurality of cylindrical platinum FKL catalyst pellets wherein one or more of the plurality of cylindrical platinum FKL catalyst pellets is characterized by:
(a) seven cylindrical holes passing through the length of the cylindrical pellets wherein one of the seven cylindrical holes is located in the center,
(b) a dome-shaped top and bottom wherein each of the dome height of the dome-shaped top and the dome-shaped bottom is 12.5 percent or less of the cylinder height of the catalyst pellet irrespective of the dome-shaped top and bottom on the pellet, and
(c) a plurality of semi-circular grooves along the length of the exterior of the cylinder wherein the diameter of the plurality of semi-circular grooves is within 10% of the diameter of each of the seven cylindrical holes,
A minimum wall thickness surrounding the plurality of holes is greater than 11 percent of the diameter of the cylindrical catalyst pellet diameter.

\* \* \* \* \*